(12) United States Patent
Nakao et al.

(10) Patent No.: US 8,692,515 B2
(45) Date of Patent: Apr. 8, 2014

(54) SERIES-CONNECTED RECHARGEABLE CELLS, SERIES-CONNECTED RECHARGEABLE CELL DEVICE, VOLTAGE-BALANCE CORRECTING CIRCUIT FOR SERIES-CONNECTED CELLS

(75) Inventors: Fumiaki Nakao, Shizuoka (JP); Yasuyuki Katsube, Shizuoka (JP)

(73) Assignee: FDK Corporation, Tokyo (JP)

( * ) Notice: Subject to any disclaimer, the term of this patent is extended or adjusted under 35 U.S.C. 154(b) by 813 days.

(21) Appl. No.: 12/305,518

(22) PCT Filed: Jun. 21, 2007

(86) PCT No.: PCT/JP2007/062478
§ 371 (c)(1),
(2), (4) Date: Jan. 7, 2009

(87) PCT Pub. No.: WO2007/148745
PCT Pub. Date: Dec. 27, 2007

(65) Prior Publication Data
US 2009/0278496 A1    Nov. 12, 2009

(30) Foreign Application Priority Data

Jun. 22, 2006  (JP) ................. 2006-172782
Jul. 31, 2006   (JP) ................. 2006-208992
Aug. 2, 2006   (JP) ................. 2006-211469

(51) Int. Cl.
*H02J 7/00* (2006.01)
(52) U.S. Cl.
USPC ............................ 320/116; 320/118
(58) Field of Classification Search
USPC ........... 320/157–159, 162–164; 324/425–434
See application file for complete search history.

(56) References Cited

U.S. PATENT DOCUMENTS 5,479,083 A  *  12/1995  Brainard ................. 320/121
5,659,237 A  *   8/1997  Divan et al. ............ 320/119

(Continued)

FOREIGN PATENT DOCUMENTS

JP    10-257683 A    9/1998
JP    2001-185229 A    7/2001

(Continued)

OTHER PUBLICATIONS

Keith Billings, "Why Have an Air Gap ?" Dec. 2, 2002, Power Electronics Technology,http://powerelectronics.com/mag/power_why_air_gap/.*

*Primary Examiner* — Drew A Dunn
*Assistant Examiner* — Robert Grant
(74) *Attorney, Agent, or Firm* — McDermott Will & Emery LLP

(57) ABSTRACT

[Object] There is provided series-connected rechargeable cells in which a large number of cells are series-connected and that makes it possible to improve performance on operations such as assembly or exchange and to perform speedy and smooth voltage-balance correcting for all cells.
[Means for Solution] Series-connected rechargeable cells includes: a large number of rechargeable cells that are series-connected, and that are divided into a plurality of series-connected cell groups placed continuously in order of connecting; and a voltage-balance correcting circuit that balances the voltages of the cells, and that is provided with an inter-cell voltage-balance correcting circuit that performs voltage-balance correcting between adjacent cells in each of the cell groups and an inter-group voltage-balance correcting circuit that performs balance correcting of series-connection voltages of the cell groups by AC-coupling formed with a transformer coil and a switching circuit.

18 Claims, 19 Drawing Sheets

(56) References Cited

U.S. PATENT DOCUMENTS

| | | | |
|---|---|---|---|
| 5,821,729 A | 10/1998 | Schmidt et al. | |
| 6,002,239 A * | 12/1999 | Maloizel | 320/136 |
| 6,222,344 B1 * | 4/2001 | Peterson et al. | 320/119 |
| 6,538,414 B1 * | 3/2003 | Tsuruga et al. | 320/119 |
| 6,556,117 B1 * | 4/2003 | Nakao et al. | 336/105 |
| 6,670,789 B2 * | 12/2003 | Anzawa et al. | 320/118 |
| 2005/0140336 A1 * | 6/2005 | Anzawa et al. | 320/118 |
| 2006/0290203 A1 * | 12/2006 | Muller | 307/11 |

FOREIGN PATENT DOCUMENTS

| | | |
|---|---|---|
| JP | 2002-10510 A | 1/2002 |
| JP | 2002-010510 A | 1/2002 |
| JP | 2004-112859 A | 4/2004 |
| JP | 2004-201361 A | 7/2004 |
| JP | 3764633 B2 | 1/2006 |
| JP | 2006-067742 A | 3/2006 |
| JP | 3764633 B2 | 4/2006 |

* cited by examiner

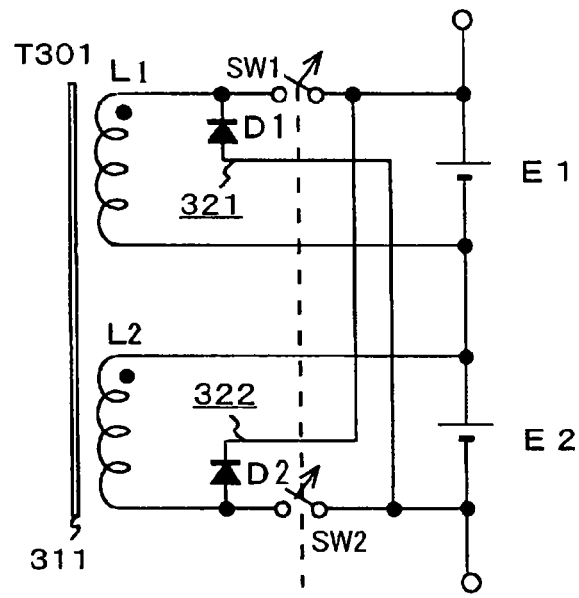
FIG. 12
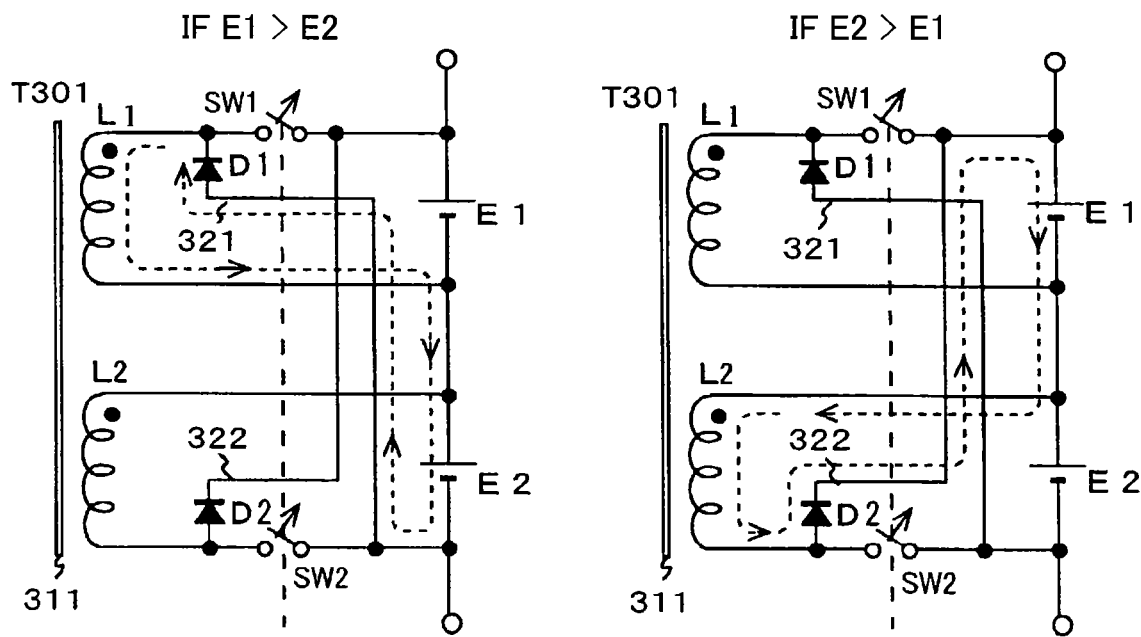
FIG. 13A
FIG. 13B

TOP VIEW OF BOARD SURFACE      PERSPECTIVE VIEW OF BOARD BACK SURFACE

US 8,692,515 B2

SERIES-CONNECTED RECHARGEABLE CELLS, SERIES-CONNECTED RECHARGEABLE CELL DEVICE, VOLTAGE-BALANCE CORRECTING CIRCUIT FOR SERIES-CONNECTED CELLS

CROSS-REFERENCE TO PRIOR APPLICATION

This is the U.S. National Phase Application under 35 U.S.C. §371 of International Patent Application No. PCT/JP2007/062478 filed Jun. 21, 2007, which claims the benefit of Japanese Patent Application Nos. 2006-172782 filed Jun. 22, 2006, 2006-208992 filed Jul. 31, 2006 and 2006-211469 filed Aug. 2, 2006, all of which are incorporated by reference herein. The International Application was published in Japanese on Dec. 27, 2007 as WO2007/148745 A1 under PCT Article 21(2).

TECHNICAL FIELD

The present invention relates to improvement in voltage-balance correcting technology for balancing the voltages of a plurality of rechargeable cells that are series-connected. In particular, the invention is effective in using for rapidly balancing voltages of a plurality of rechargeable cells that are series-connected.

BACKGROUND ART

Regarding a rechargeable cell such as a capacitor or a secondary battery, a large number of cells of this type is often used being series-connected. In such a case, if the voltage is different among the cells, a problem occurs that lifetimes of the cells shorten due to concentration of voltage in a specific cell. The more cells are series-connected, the more noticeable this problem is. Therefore, in the use of rechargeable cells with being series-connected, the voltages of the cells are required to undergo balance correcting (to be balanced). The description below shows conventional arts for performing the voltage-balance correcting.
—Voltage-Balance Correcting Circuit—
As a circuit for balance correcting the voltages of cells (voltage-balance correcting circuit), an inductor coupling type and a transformer coupling type are known (see Patent document 1 to 3, for example). Conventional examples 1 to 3 will be given below as a conventional voltage-balance correcting circuit.

CONVENTIONAL EXAMPLE 1

The circuit shown in FIG. 7 is an inductor-coupled, voltage-balance correcting circuit, in which the voltages of cells 11 are balanced using an inductor Lc and switching devices Sa, Sb. In other words, by charge and discharge by an inductor current between each pair of B1 and B2, B2 and B3, ..., and Bn−1 and Bn that are adjacent, the voltages between the two cells is balanced to be a same voltage.

Therefore, the inductors Lc are each disposed in between the cells 11. In addition to these, the switching circuits Sa, Sb are also disposed that cause the inductors Lc to alternately connect to the first cell and the second cell respectively.

FIG. 8 shows a transformer-coupled, voltage-balance correcting circuit, in which cells 11 (B1 to Bn) are AC-coupled (AC coupled) by a plurality of transformer coils L1 to Ln having the transformation ratio of 1:1 and switching circuits Sc that are turned ON/OFF in phase. Thereby, the voltages of the cells 11 (B1 to Bn) are balanced to a same voltage.

The series-connected rechargeable cells the voltage balance of each of which is corrected in the foregoing manner is used with ends P1, P2 of the series-connected cells (B1 to Bn) being connected to a generation/load device 100 such as an electric motor that becomes power of electric-powered car, for example. Here, an idea of voltage-balance correcting by the voltage-balance correcting circuit shown in the foregoing FIGS. 7 and 8 is defined as the conventional example 1.

CONVENTIONAL EXAMPLE 2

A technological idea based on the voltage-balance correcting circuit shown in FIG. 11 is defined as the conventional example 2. The conventional example 2 is an inductor-coupled, voltage-balance correcting circuit 231 in which switching devices S201, S202 and an inductor Lc are used for two rechargeable cells B201, B202 that are series-connected. As shown in (a), (b), and (c) of the figure for each operating condition, the voltage-balance correcting circuit 231 has a configuration in which both ends of two switching devices S201, S202 that are series-connected and are alternately turned ON are connected in parallel to both ends of two rechargeable cells B201, B202 that are series-connected, and also inductor Lc bridges a middle connecting point of the cells B201, B202 and a middle connecting point of the switching devices S201, S202 and is connected therebetween.

In the switching devices S201, S202, a power MOS-FET is used. Each of the switching devices S201, S202 has a diode connected in parallel, which is in reverse orientation with respect to the rechargeable cells B201, B202. This diode is a parasitic diode (body diode) that is formed equivalently between a drain and source of the FET.

Two switching devices S201, S202 are alternately turned ON by two-phase pulse control signal given from a control circuit (illustration omitted), and thereby the voltage between cells B201, B202 is balanced.

More specifically, as shown in (a), when the one of the switching devices, S201, is ON, the inductor Lc is charged by an inductor current through the S201 from the one of the cells, B201. On the other hand, as shown in (b), when the S202 is ON, the inductor Lc is charged by the inductor current through the S202 from the other one of cells, B202.

When the other switching device S202 becomes ON, an inductor current that charges flowing out of the one cell B201 discharges while charging the other cell B202 through this S202. Further, when the one switching device S201 becomes ON, an inductor current that charges flowing out of the other cell B202 discharges while charging the one cell B202 through this S201.

By indirectly coupling the cells B201, B202 through the inductors Lc in this manner, balance correcting is performed in which voltages of both cells B201, B202 are balanced to be a same voltage. This can prevent deterioration of cells caused by concentration of the voltage in a specific cell.

CONVENTIONAL EXAMPLE 3

The voltage-balance correcting circuit shown in FIG. 21 is given as a conventional example 3. This is a voltage-balance correcting circuit for series-connected cells, in which a plurality of transformer coils L1, L2 and switches SW1, SW2 are used, the transformer coils L1, L2 having transformation ratio of 1:1 and being wound around a same magnetic core 311 having the same number of turns, the switches SW1, SW2 being turned ON/OFF in conjunction with each other. In the voltage-balance correcting circuit shown in the figure, cells E1, E2 are transformer-coupled through the coils L1, L2 by turning the conjunctive switches SW1, SW2 ON/OFF. Since the coils L1, L2 have the same number of turns and the transformation ratio of 1:1 therebetween, electric power transmission between the coils L1, L2 is not performed if the cells E1, E2 has a same voltage, that is, the voltage is balanced.

However, suppose that the voltage of cell E1 on the coil L1 side is higher than voltage of cell E2 on the coil L2 side, an operation of a transformer in which L1 serves as a primary coil and L2 serves as a secondary coil performs electric power transmission from E1 to E2. Thereby, the voltages of E1 and E2 are balanced. In contrast, if the voltage of E2 is higher than that of E1, electric power transmission is performed from E2 to E1 contrary to the foregoing case, and the voltages are balanced.

Patent document 1: JP-A-2001-185229
Patent document 2: JP-A-2006-67742
Patent document 3: JP-A-2004-201361 (paragraph 0046)

DISCLOSURE OF INVENTION

Problem to be Solved by the Invention

Conventional arts for voltage-balance correcting have various problems. Hereinbelow, problems of each of the above-mentioned conventional examples will be given, and the problems, problems to be solved by the Invention, and an object of the present invention will be clear.

PROBLEM ON CONVENTIONAL EXAMPLE 1

The above-mentioned conventional example 1 is effective when the number of series-connected rechargeable cells that are correction objects is not very large. However, the more cells are series-connected, the more noticeable the following problem is. For example, in an electric power source for an electric-powered car, electric-power storage system for load-leveling or the like, tens or hundreds of rechargeable cells are often used being series-connected. In such a case, the voltages of the cells are required to undergo balance correcting.

If the number of cells that are series-connected is large, balance correcting between adjacent cells can be performed speedily and smoothly in the inductor-coupled, voltage-balance correcting circuit shown in FIG. 7. However, it takes time to complete the balance correcting for all cells. This is because it takes time to transfer cell by cell a local effect of balance correcting that is performed between adjacent cells and to reach all cells (B1 to Bn).

On the other hand, in the transformer-coupled, voltage-balance correcting circuit shown in FIG. 8, by AC coupling all the cells (B1 to Bn) through the transformer coils (L1 to Ln) having the transformation ratio of 1:1, it is possible to concurrently perform the balance correcting for all the cells.

However, the number of coils in the transformer T1 is limited. The number of coils that can be wound around a same magnetic core 21 is limited to ten to tens. Accordingly, the transformer-coupled, voltage-balance correcting circuit cannot be applied to series-connected rechargeable cells having more than a hundred of cells that are series-connected, for example.

Further, when the number of rechargeable cells that are series-connected is large, the number of wirings between the transformer T1 and a cell row (B1 to Bn) is also large; as a result thereof, a problem occurs that performance on operations such as assembly or exchange of series-connected rechargeable cells deteriorates considerably.

PROBLEM ON CONVENTIONAL EXAMPLE 2

In the voltage-balance correcting circuit 231 of the conventional example 2, it is possible to prevent deterioration of cells caused by concentration of the voltage in a specific cell. However, this voltage-balance correcting is not enough to surely prevent deterioration or breakage of rechargeable cells. The series-connected rechargeable cells B201, B202 are energized with a charging current Ic from the outside; if a specific cell B201 or B202 is overcharged, it is necessary to selectively interrupt or reduce energizing the cell B201 or B202 in question.

For this purpose, it is advisable to provide the series-connected cells with their respective current by-pass circuits that operates in overcharge condition only and makes a charging current bypass. The current by-pass circuit can be configured using a switching device such as power MOS-FET.

However, if a large number of rechargeable cells that are series-connected are each provided with both of the above-mentioned voltage-balance correcting circuit and the above-mentioned current by-pass circuit, this causes problems of increasing the number of components and costs, and of difficulty in mounting.

PROBLEM ON CONVENTIONAL EXAMPLE 3

In the voltage-balance correcting circuit of the conventional example 3, if the coil L1 or L2 acts as the primary coil of the transformer, a self-induced current is to flow in L1 or L2 during a period when the switch SW1 or SW2 interrupts a primary current that is supplied to the coil L1 or L2 from the cell E1 or E2. If this self-induced current does not discharge, there is a risk that counter-electromotive force having abnormally high voltage (surge) is generated to break the switches SW1, SW2 and the like.

Therefore, normally, as shown in FIG. 22, a damping circuit 351 that absorbs the above-mentioned counter-electromotive force is connected to the coils L1, L2 in parallel. The damping circuit 351 is referred to as a surge absorption circuit or a reset circuit, and is generally composed of a combination of a diode and a resistance.

However, the above-mentioned damping circuit 351 is for suppressing counter-electromotive force by consuming as heat an electrical energy that is stored in the coils L1, L2 due to energizing. Energy consumption therefore occurs each time the switch SW1 or SW2 change from ON to OFF.

Therefore, if, for example, the voltage of E1 is higher than that of E2, electric power transmission from E1 to E2 balances the voltages of the two cells. However, this leads to a problem of great electric power loss. It should be noted that the voltage-balance correcting circuit shown in FIG. 22 is defined as the conventional example 3, together with the circuit shown in FIG. 21.

Object Of Present Invention

An object of the present invention is to solve various problems on the voltage-balance correcting technology for the above-mentioned conventional rechargeable cell, which can be specifically summarized in the following (1) to (3).
(1) To provide series-connected rechargeable cells in which a large number of cells are series-connected and that makes it possible to improve performance on operations such as assembly or exchange and to perform speedy and smooth voltage-balance correcting for all cells.
(2) To provide a series-connected rechargeable cell device having both functions to balancing voltages between cells and to protect the cells in overcharge condition, without increasing the number of components and costs or without difficulty in mounting.

(3) To provide a voltage-balance correcting circuit for series-connected cells that can rapidly and efficiently balance voltages of a plurality of rechargeable cells that are series-connected, without great electric power loss.

Means for Solving the Problem

The present invention for achieving the above-mentioned object (1) mainly is series-connected rechargeable cells, including: a large number of rechargeable cells that are series-connected, and that are divided into a plurality of series-connected cell groups placed continuously in order of connecting; and a voltage-balance correcting circuit that balances the voltages of the cells, and that is provided with an inter-cell voltage-balance correcting circuit that performs voltage-balance correcting between adjacent cells in each of the cell groups and an inter-group voltage-balance correcting circuit that performs balance correcting of series-connection voltages of the cell groups by AC-coupling formed with a transformer coil and a switching circuit. This is defined as the first invention.

Series-connected rechargeable cells in the first invention wherein the inter-cell voltage-balance correcting circuit performs voltage-balance correcting between a first cell and a second cell that are adjacent, by charging and discharging by an inductor current between the cells. This is defined as the second invention.

Series-connected rechargeable cells in the second invention wherein the inter-cell voltage-balance correcting circuit is configured using an inductor that is connected alternately to the first cell and the second cell and that performs charge and discharge by the inductor current. This is defined as the third invention. Series-connected rechargeable cells in the second invention wherein the inter-cell voltage-balance correcting circuit is configured using a first inductor that discharges itself through a charge path of the second cell when the first inductor is charged by the inductor current from the first cell, a second inductor that discharges itself through a charge path of the first cell when the second inductor is charged by the inductor current from the second cell, and a switching circuit that switches charge and discharge of the first and second inductors. This is defined as the fourth invention.

Series-connected rechargeable cells in any of the second to fourth invention, wherein a plurality of the inductors that the inter-cell voltage-balance correcting circuit is composed of are disposed in the cell groups, and the inductors are magnetically coupled with each other. This is defined as the fifth invention.

The sixth invention is series-connected rechargeable cells in the first invention, wherein the inter-group voltage-balance correcting circuit is configured using a plurality of transformer coils that are magnetically coupled at the transformation ratio of 1:1.

Series-connected rechargeable cells in the first invention, wherein the inter-group voltage-balance correcting circuit is configured using a transformer having a primary coil that connects to an end of all series-connected cell groups through the switching circuit, and secondary coils that respectively connect to an end of each of the series-connected cell groups through the switching circuit. This is defined as the seventh invention.

The present invention for achieving the above-mentioned object (2) mainly is a series-connected rechargeable cell device, including: a plurality of rechargeable cells that are series-connected; and a voltage-balance correcting circuit in which a semiconductor switching device is used in order to balance the voltage between the cells, and that the switching device is used to form a current by-pass circuit that is for protecting the rechargeable cells in overcharge condition. The invention is defined as the eighth invention.

A series-connected rechargeable cell device in the eighth invention, wherein the voltage-balance correcting circuit has a configuration in which both ends of two switching devices that are series-connected and are alternately turned ON are connected in parallel to both ends of two rechargeable cells that are adjacent in order in the series-connection, and in which an inductor bridges a middle connecting point of the two rechargeable cells and a middle connecting point of the two switching devices and is connected therebetween. This is defined as the ninth invention.

A series-connected rechargeable cell device in the eighth or the ninth invention, wherein the current by-pass circuit is formed by causing the switching device that is not ON to act as a resistance element. This is defined as the tenth invention.

A series-connected rechargeable cell device in the eighth invention, wherein a MOS-FET is used as the switching device of the voltage-balance correcting circuit, and a level conversion circuit is disposed, the level conversion circuit converting a OFF-setting level of a two-level control signal that controls ON/OFF of the MOS-FET, into a level at which the signal sets the FET at a predetermined resistivity. This is defined as the eleventh invention.

The present invention for achieving the above-mentioned object (3) mainly is a voltage-balance correcting circuit for series-connected cells, including: a plurality of rechargeable cells that are series-connected; a plurality of transformer coils that are wound around a same magnetic core having the same number of turns and that have the transformation ratio of 1:1; switches that are turned ON/OFF in conjunction with each other and through which the rechargeable cells are connected to the transformer coils on a one-to-one basis so that the voltage of each of the cells is balanced; and a commutation circuit that during a period when the switches change from ON to OFF, a self-induced current generated in the coil that is supplied with a primary current from the rechargeable cell discharges through a path for charging the cell other than the cell that is not connected to the coil. The invention is defined as the twelfth invention.

A voltage-balance correcting circuit for series-connected cells in the twelfth invention, wherein the commutation circuit consists of a first discharge circuit and a second discharge circuit that are connected between the two transformer coils, the first discharge circuit is configured so that a self-induced current that is generated when one of the coils is supplied with the primary current charges the rechargeable cell that is on a side close to the other of the coils through a backflow-preventing diode, and the second discharge circuit is configured so that a self-induced current that is generated when the other coils is supplied with the primary current charges the rechargeable cell that is on a side close to the one coil through a backflow-preventing diode. This is defined as the thirteenth invention.

A voltage-balance correcting circuit for series-connected cells in the thirteenth invention, wherein the first discharge circuit and the second discharge circuit are disposed between the transformer coils that are connected through the switches respectively to two adjacent series-connected rechargeable cells. This is defined as the fourteenth invention.

A voltage-balance correcting circuit for series-connected cells in the thirteenth or the fourteenth invention, wherein the commutation circuit is disposed for each pair of two sets of the transformer coil and the rechargeable cell, and either one of the first discharge circuit and the second discharge circuit is disposed for a set of a transformer coil and a rechargeable cell that are not mated. This is defined as the fifteenth invention.

A voltage-balance correcting circuit in the fifteenth invention, wherein the rechargeable cell that is not mated has a larger charge and discharge capacity than another cell. This is defined as the sixteenth invention.

A voltage-balance correcting circuit for series-connected cells in the twelfth invention, wherein a magnetic core around which the transformer coil is wound is provided with a magnetic route gap. This is defined as the seventeenth invention.

A voltage-balance correcting circuit for series-connected cells in the twelfth invention, wherein the transformer coil is formed by a flat loop body in which a flat cable belt is used and that is formed by bending the flat cable belt, the flat cable belt being formed by lining in parallel coated wires the number of which is the number of the coils. This is defined as the eighteenth invention.

A voltage-balance correcting circuit for series-connected cells in the twelfth invention, wherein the transformer coil is formed by wiring a conductor pattern with a through hole, the conductor pattern being formed on a front surface and a back surface of a printed wiring board. This is defined as the nineteenth invention.

The twentieth invention is a voltage-balance correcting circuit for series-connected cells in any of the first, second, thirteenth, seventeenth to nineteenth invention, wherein at least either one of a first discharge loop and a second discharge loop is disposed in which a self-induced current is released while charging a plurality of the series-connected cells connected to others, the self-induced current being generated in either one of the transformer coil that is provided on a high-level end of series-connected rechargeable cells and the transformer coil that is provided on a low-level end. A voltage-balance correcting circuit for series-connected cells in the twelfth invention, wherein the backflow-preventing diode is configured using a rectifier diode that is a non-linear element having two terminals. This is defined as the twenty-first invention.

BRIEF DESCRIPTION OF DRAWINGS

[FIG. 12] This is a circuit diagram showing a basic embodiment of a voltage-balance correcting circuit in the third working example of the present invention.

[FIG. 13] This is a circuit diagram showing operations of the voltage-balance correcting circuit shown in FIG. 12.

Figure 1:
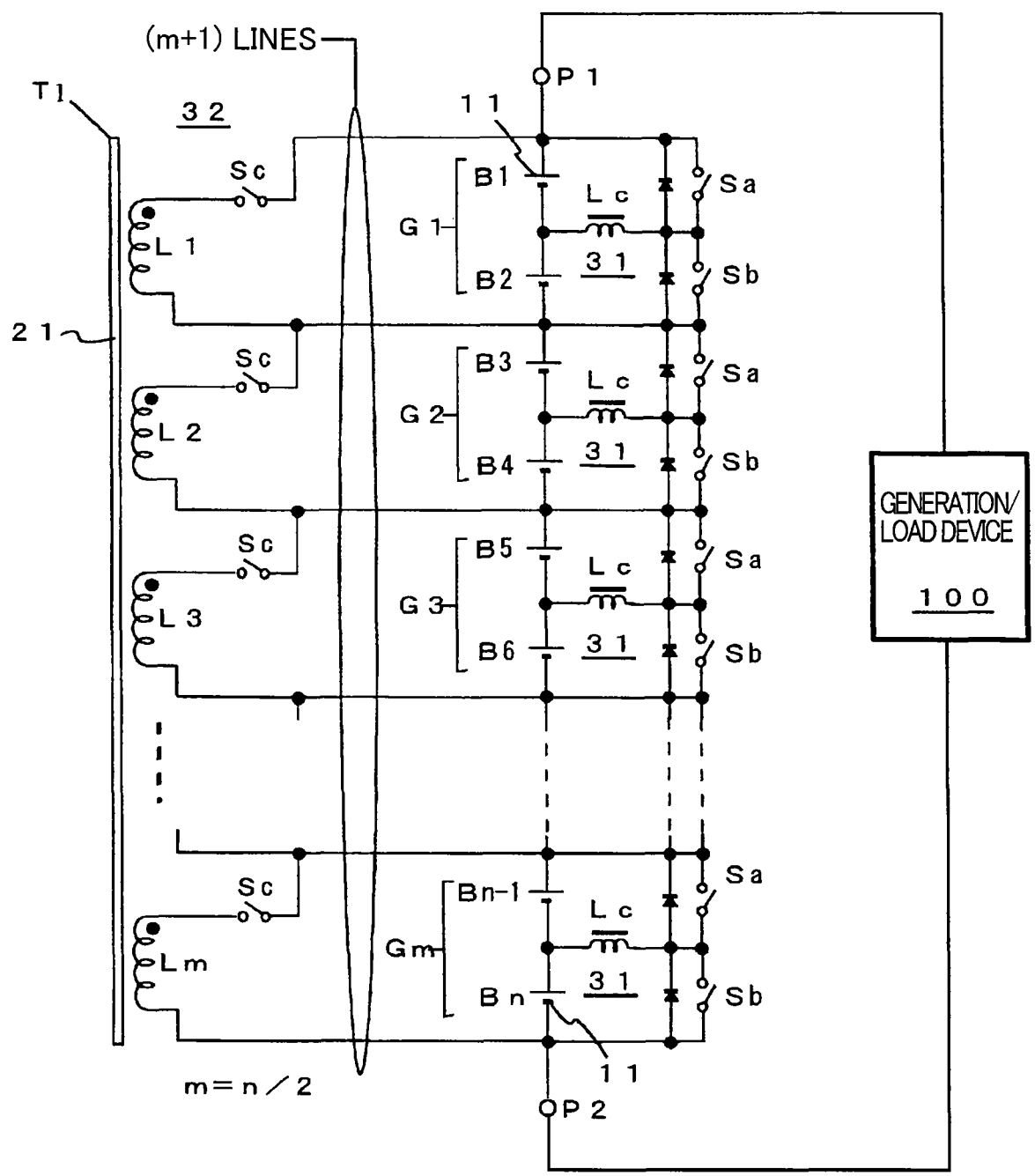
[FIG. 1] This is a circuit diagram of series-connected rechargeable cells according to the first working example of the present invention.

LIST OF REFERENCE NUMERALS 100 generation/load device
11, B1 to Bn, E1 to En rechargeable cell
21, 22, 311 magnetic core
31 inter-cell voltage-balance correcting circuit
32 inter-group voltage-balance correcting circuit
G1 to Gm cell groups
Lc, Lc1, Lc2 inductor
L1 to Lm transformer coil
P1, P2 series-connection ends of series-connected rechargeable cells 11
Sa, Sb, Sc switching circuit
T1, T301, T301$a$, T301$b$ transformer
231 voltage-balance correcting circuit
235 voltage detector
238 OR gate
251 overcharge detection circuit
261 control circuit
262 level conversion circuit
B1, B2, B101, B102, E1 to E2$n$ rechargeable cell
D261, D262, D1 to D2$n$ diode
Ic charging current
ip by-pass current
R261, R262 resistance
S1, S2 switching device Vb bias voltage
Φ1, Φ2 control signal
L1 to L2n transformer coil
SW1 to SW2n switch
312 magnetic route gap
321 first discharge circuit
322 second discharge circuit
331 printed wiring board
333, 334 connector terminal
335 flat cable belt
336, 337 conductor pattern
338 wiring by through hole

BEST MODE FOR CARRYING OUT THE INVENTION

FIRST WORKING EXAMPLE

The invention for achieving the above-mentioned object (1) mainly is series-connected rechargeable cells; an embodiment according to the invention and a modified example thereof is defined as a first working example. FIG. 1 shows the basic concept of series-connected rechargeable cells according to the first working example. The series-connected rechargeable cells shown in the figure is ones in which a large number (n) of rechargeable cells 11 (B1 to Bn) are series-connected, and has a configuration in which ends P1, P2 of the series connection are connected to a generation/load device 100 such as an electric motor that becomes power of electric-powered car and are used with being charged and discharged.

In the figure, n number of rechargeable cells B1 to Bn that are series-connected are divided into cell groups (G1, G2, G3, ..., Gm) that each consist of two cells (B1 and B2, B3 and B4, ..., Bn−1 and Bn) placed continuously in order of connecting. Each of the cell groups (G1,G2, G3, ..., Gm) is provided therein with an inter-cell voltage-balance correcting circuit 31 that performs voltage-balance correcting between adjacent cells.

The inter-cell voltage-balance correcting circuit 31 is an inductor-coupled, voltage-balance correcting circuit consisting of inductors Lc and switching circuits Sa, Sb, and performs voltage-balance correcting between the first cell (B1, B3, ..., Bn−1) and the second cell (B2, B4, ..., Bn) that are adjacent to each other, by charge and discharge by an inductor current between the both cells.

Switching circuits Sa, Sb is configured using a MOS-FET, and is alternately turned ON/OFF by a two-phase pulse signal given from a control circuit that is not shown. When one of the switching circuits, Sa, is ON, the inductor Lc is charged by an inductor current from the first cell (B1, B3, ..., Bn−1). At this stage, the other switching circuit Sb is OFF.

When the one switching circuit Sa changes its state from ON to OFF, the inductor current that charged Lc discharges while charging the second cells (B2, B4, ..., Bn) through the other switching circuit Sb.

Here, considering the cells B1 and B2, if the voltage of B1 is higher than that of B2, an inductor current that charged the inductor Lc by B1 discharges thorough a charge path of B2 so that voltage between the cells B1, B2 is balanced. In contrast thereto, if the voltage of B1 is lower than that of B2, an inductor current that charged the inductor Lc by B2 discharges through a charge path of B1 so that voltage between the cells B1, B2 is balanced.

That is, if there is a difference in voltage between two adjacent cells B1, B2, the voltages of both cells B1, B2 are balanced by transferring electrical energy from the cell having higher voltage to the cell having lower voltage through an inductance Lc. This balance correcting operation is performed in each of the cell groups (G1, G2, G3, ..., Gm) independently.

A diode is connected to each of the switching circuits Sa, Sb, and this diode is configured by a parasitic diode (body diode) that is formed equivalently between a drain and source of the MOS-FET. This diode is in reverse orientation with respect to the voltage of the cell 11, but in a forward direction with respect to the inductor current, so that it results in the following effect.

That is, if an inductor current remains at a period when the switching circuits Sa, Sb are both OFF, the remaining inductor current can continue to flow through the diode. Therefore, the inductor current generated once in the inductor Lc can be used for the voltage-balance correcting operation without wasting the current, and it is also possible to surely suppress the occurrence of surge voltage that is generated when the inductor current is interrupted.

In addition to the inter-cell voltage-balance correcting circuit 31, the series-connected rechargeable cells shown in FIG. 1 is provided with an inter-group voltage-balance correcting circuit 32 that corrects the balance of the series-connection voltage for each of the cell groups (G1, G2, G3, ..., Gm).

The inter-group voltage-balance correcting circuit 32 is a transformer-coupled, voltage-balance correcting circuit, which uses the transformer T1. The inter-group voltage-balance correcting circuit 32 consists of a plurality of transformer coils (L1 to Lm) that are wound around a same magnetic core 21 having the same number of turns and have the transformation ratio of 1:1, and switching circuits Sc that are turned ON/OFF in phase.

The transformer coils (L1 to Lm) are each connected to series-connection ends of the respective cell groups (G1, G2, G3, ..., Gm). The switching circuits Sc are configured using a MOS-FET, and are turned ON/OFF in phase according to periodic pulse signals (clock signals) given from a control circuit that is not shown.

By these switching circuits Sc, each of the cell groups (G1, G2, G3, ..., Gm) are each AC coupled with the transformation ratio of 1:1. Thereby, the balance correcting is performed in such a manner as the series-connection voltage of each of the cell groups (G1, G2, G3, ..., Gm) become the same voltage.

In the above-mentioned series-connected rechargeable cells, the cells (B1 and B2, B3 and B4, ..., Bn−1 and Bn) are divided into groups, and correction of the voltage of the adjacent cells that are in inductor coupling is performed in the groups (G1, G2, G3, ..., Gm); this makes it possible to perform speedy and smooth voltage-balance correcting in each of the cell groups. At the same time, by correct the balance of the series-connection voltage for each of the cell groups (G1, G2, G3, ..., Gm) in transformer coupling, voltage-balance correcting can be performed for all cells (B1 to Bn) speedily, smoothly, and in addition, precisely.

Besides, in the embodiment shown in FIG. 1, a single pair of the inductor Lc and the switching circuits Sa, Sb is enough for two cells 11, the pair being for balance correcting in inductor coupling. Thereby, compared to a conventional method in which voltage-balance correcting for all the cells (B1 to Bn) is performed in inductor coupling, it is possible to greatly reduce the number of components of the inductor Lc and switching circuit Sa, Sb. Reduction of the number of components leads to reduction of the heat generation amount and also an effect of increasing packing density (gathering density) of the cells (B1 to Bn).

Further, the transformer coupling, voltage-balance correcting circuit 32 needs wiring that connects the transformer coils (L1 to Ln) and the cell groups (G1, G2, G3, ..., Gm). However, (m+1) lines, adding one to the number of cell groups (G1, G2, G3, ..., Gm), is enough for this wiring; the number of wiring is greatly reduced compared to a conventional method in which voltage-balance correcting for all the cells (B1 to Bn) is performed in transformer coupling.

According to the foregoing, in series-connected rechargeable cells in which a large number of cells are series-connected, it is possible to improve performance on operations such as assembly or exchange and to perform to speedy and smooth voltage-balance correcting for all cells.

Figure 2:
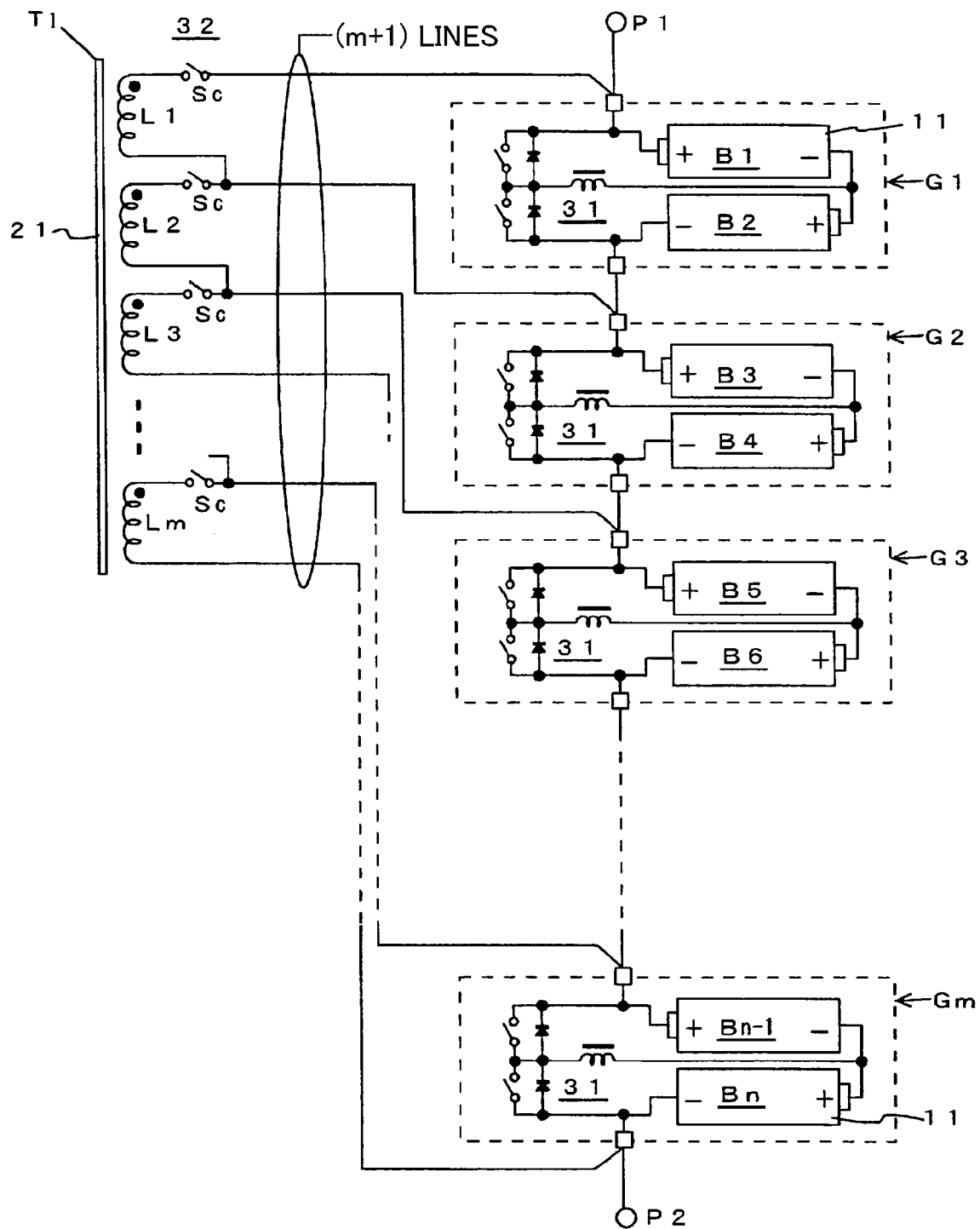
[FIG. 2] This is a circuit diagram showing a portion of a circuit shown in FIG. 1 more specifically.

FIG. 2 is a circuit diagram showing the wiring condition of the above-mentioned cell groups (G1, G2, G3, ..., Gm) in a form closer to actual state. As shown in the figure, in each of the cell groups (G1, G2, G3, ..., Gm), two cells are designed in modules. By taking a module as a unit, it is possible to perform efficiently operation such as assembling the series-connected rechargeable cells or exchanging cells.

Figure 3A:
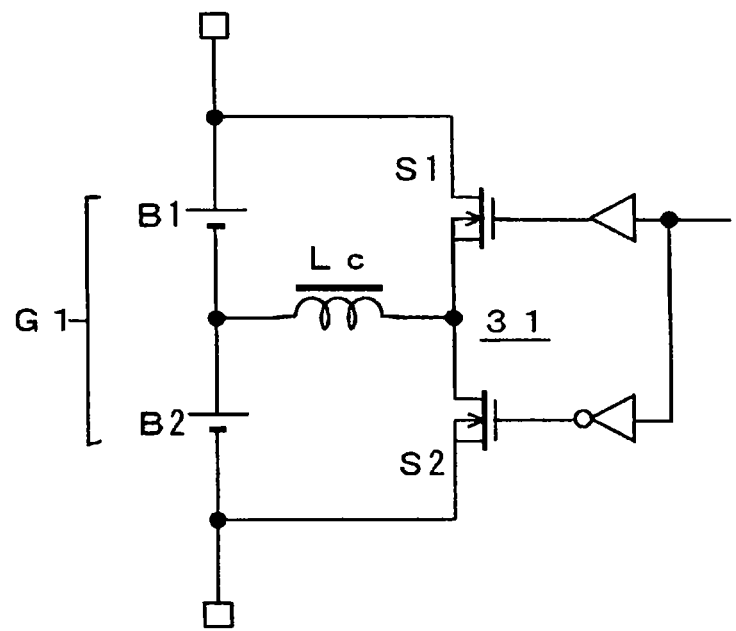
[FIG. 3] This is a circuit diagram of an inter-cell voltage-balance correcting circuit used in the first working example.
Figure 3B:
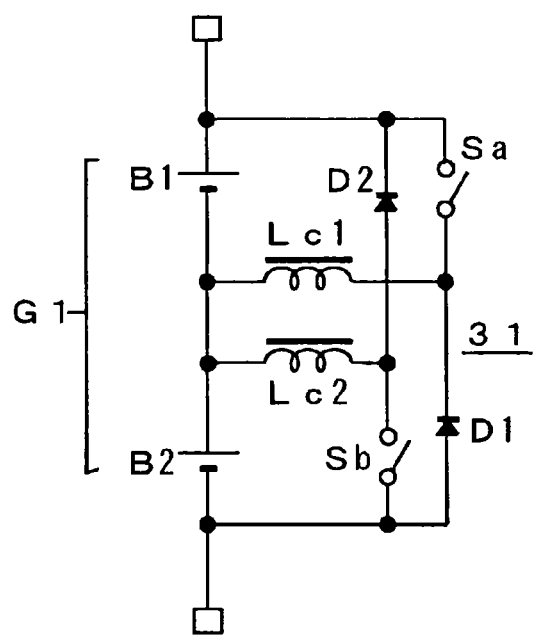

FIG. 3 shows an embodiment of the voltage-balance correcting circuit 31 in inductor-coupling. The voltage-balance correcting circuit 31 of this type can have such a configuration as shown in (a) and (b) of the figure, for example.

The voltage-balance correcting circuit 31 shown in (a) of the figure is based on the same principle as the inter-cell voltage-balance correcting circuit 31 shown in FIG. 1 or 2; the circuit 31 causes an inductor current to charge and discharge the inductor Lc between the adjacent first cell B1 and second cell B2, and thereby the voltage-balance correcting between the cells B1, B2 is performed.

The voltage-balance correcting circuit 31 shown in (b) of the figure is configured using: the first inductor Lc1 that is discharged through the charge path of the second cell B2 by an inductor current charging the inductor from the first cell B1; the second inductor Lc2 that is discharged through the charge path of the first cell B1 by an inductor current charging the inductor from the second cell B2; the switching circuits Sa, Sb that switches charge and discharge of the first and second inductors Lc1, Lc2; and diodes D1, D2.

In the circuit 31, when the first switching circuit Sa is ON, an inductor current from the first cell B1 charges the first inductor Lc1. When the first switching circuit Sa turns OFF, this inductor current discharges passing the diode D1 through the charge path of the second cell B2.

When the first switching circuit Sa is OFF, the second switching circuit Sb is ON, and the second inductor Lc2 is charged by an inductor current from the second cell B2. When the second switching circuit Sb turns OFF, this inductor current discharges passing the diode D2 through the charge path of the first cell B1.

As mentioned above, in the voltage-balance correcting circuit 31 in (b) of the figure, balance correcting operation by charge and discharge by an inductor current is performed simultaneously in both of the first and second cells B1, B2. Thereby, it becomes possible to make speedier voltage-balance correcting between the cells B1, B2.

Figure 4A:
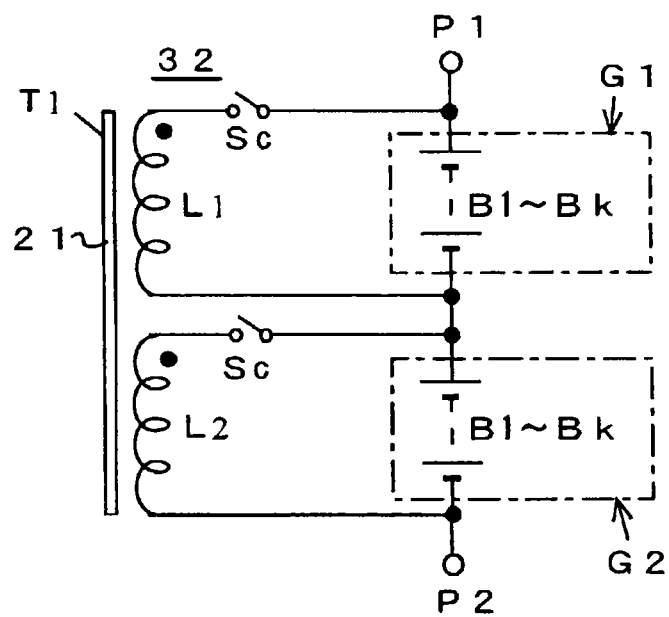
[FIG. 4] This is a circuit diagram of an inter-group voltage-balance correcting circuit used in the first working example.
Figure 4B:
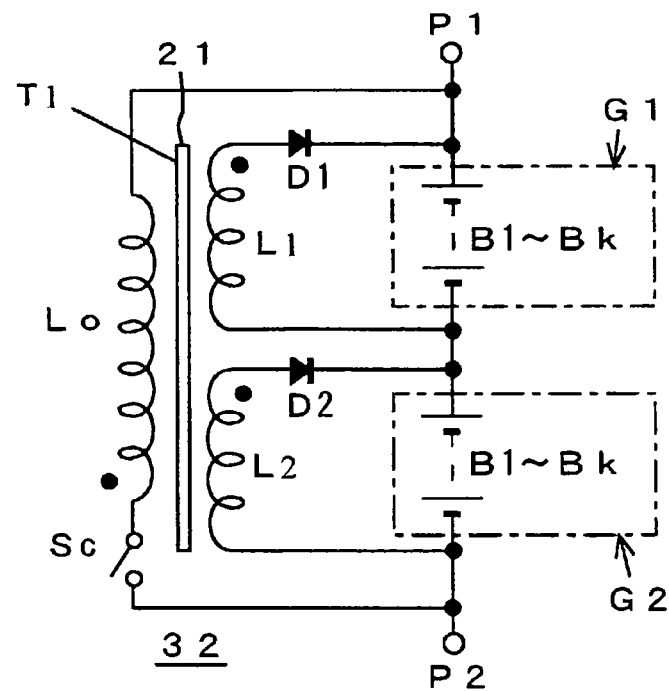

FIG. 4 shows an embodiment of a voltage-balance correcting circuit 32 in transformer coupling. This voltage-balance correcting circuit can have such a configuration as shown in (a) and (b) of the figure, for example.

The voltage-balance correcting circuit 32 shown in (a) of the figure is one whose principle is the same as the inter-group voltage-balance correcting circuit 32 shown in FIG. 1 or 2; two cell groups G1, G2 are respectively connected to coils L1, L2 of a transformer T1 through switching circuits Sc, so that the two cell groups G1, G2 are AC coupled with the transformation ratio of 1:1 and the voltage-balance correcting is performed.

The cell groups G1, G2 each consists of a module in which k number of rechargeable cells (B1 to Bk) are series-connected. Inside each of the cell groups G1, G2, an inter-cell voltage-balance correcting circuit, which is inductor coupling type, is provided, and the illustration in the drawings is omitted.

In the voltage-balance correcting circuit 32 shown in (b) of the figure, the transformer T1 including a primary coil Lo and the secondary coils L1, L2 are used. Series-connection ends (P1, P2) of all the cell groups (G1, G2) are connected to the primary coil Lo through the switching circuits Sc. The secondary coils L1, L2 are connected respectively to the cell groups (G1, G2) through diodes D1, D2 that are for rectifying and for preventing backflow.

The secondary coils L1, L2 are wound around the same magnetic core 21 having the same number of turns. The primary coil Lo is wound in a direction that makes D1, D2 OFF when Sc is ON, in such a manner as the core 21 can be energized the series-connection voltage of all the cells. When Sc is turned ON, the series-connection voltage of all the cells is applied to Lo and energizes the core 21. Next, when Sc is turned OFF, a current flows into secondary windings L1, L2 through D1, D2 in such a manner as to keep this exciting current. At this time, since the current is concentrated and flows into the winding whose voltage per turn is lower, the voltage-balance correcting between the cell groups (G1, G2) is performed.

The series-connection voltage of all the cells is applied to the primary coil Lo by turning the switching circuit Sc ON/OFF. This applied voltage is transformed at a certain voltage ratio and is generated on the secondary coils L1, L2. The transformed voltage generated on the secondary coils L1, L2 is applied to cell groups (G1, G2) through the diodes D1, D2. Thereby, voltage-balance correcting between the cell groups (G1, G2) is performed.

The inter-group voltage-balance correcting circuit 32 performs voltage-balance correcting by re-distributing the series-connection voltage of all the cells concurrently to the cell groups (G1, G2); thereby, it becomes possible to make the balance correcting operation speedy.

Figure 5:
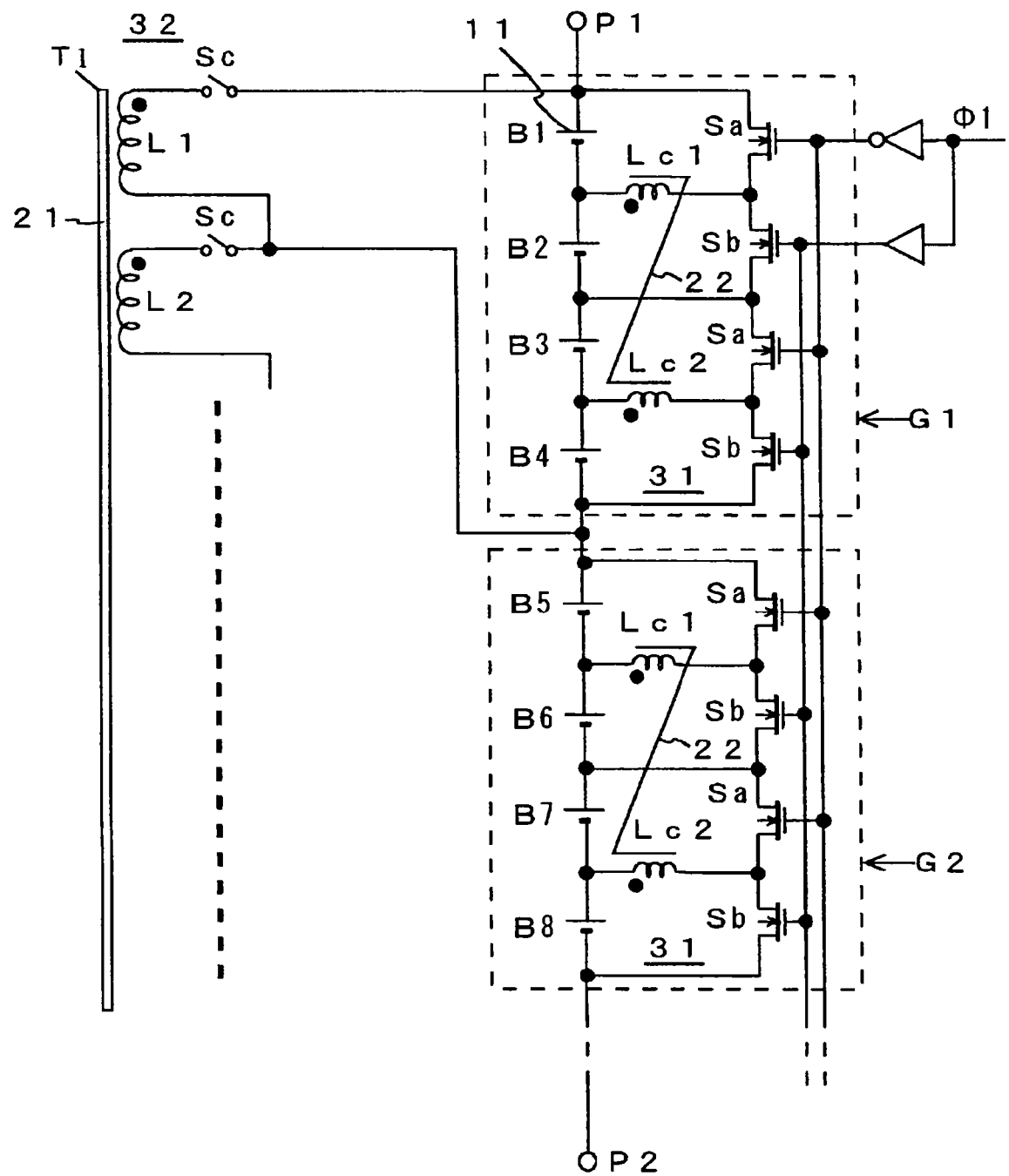
[FIG. 5] This is a circuit diagram corresponding to a modified embodiment of the series-connected rechargeable cells of the first working example.

FIG. 5 shows a modified embodiment of the series-connected rechargeable cells according to the first working example. The series-connected rechargeable cells shown in the figure includes, in each of the cell groups (G1, G2, ...), four rechargeable cells 11 (B1 to B4, B5 to B8, ...) that are series-connected. In other words, a module of the cell groups (G1, G2, ...) are configured taking the four series-connected cells (B1 to B4, B5 to B8, ...) as a unit.

Figure 6:
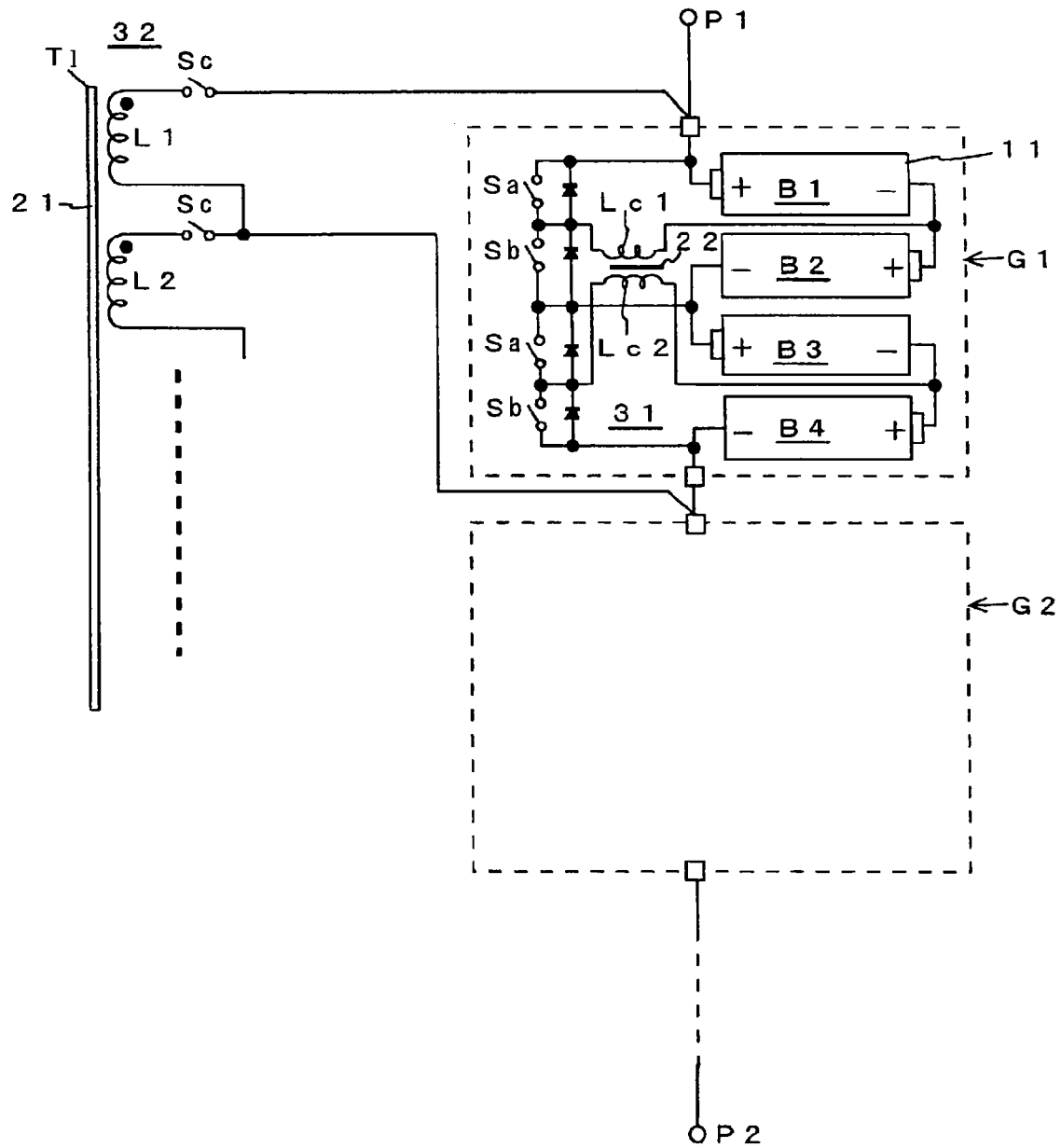
[FIG. 6] This is a circuit diagram showing a portion of the circuit shown in FIG. 5 more specifically.
Figure 7:
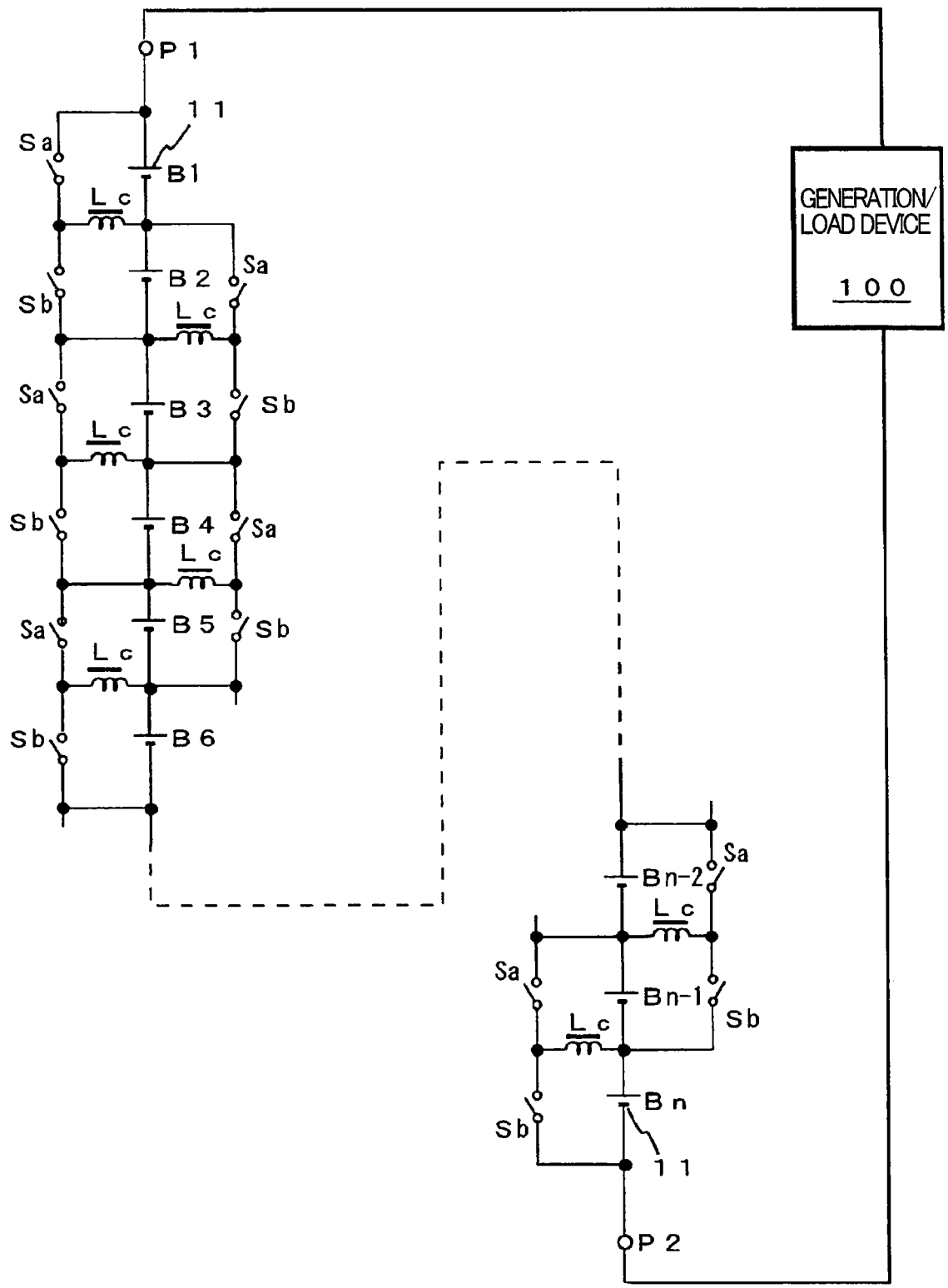
[FIG. 7] This is a circuit diagram showing a first configuration example of series-connected rechargeable cells of the conventional example 1.
Figure 8:
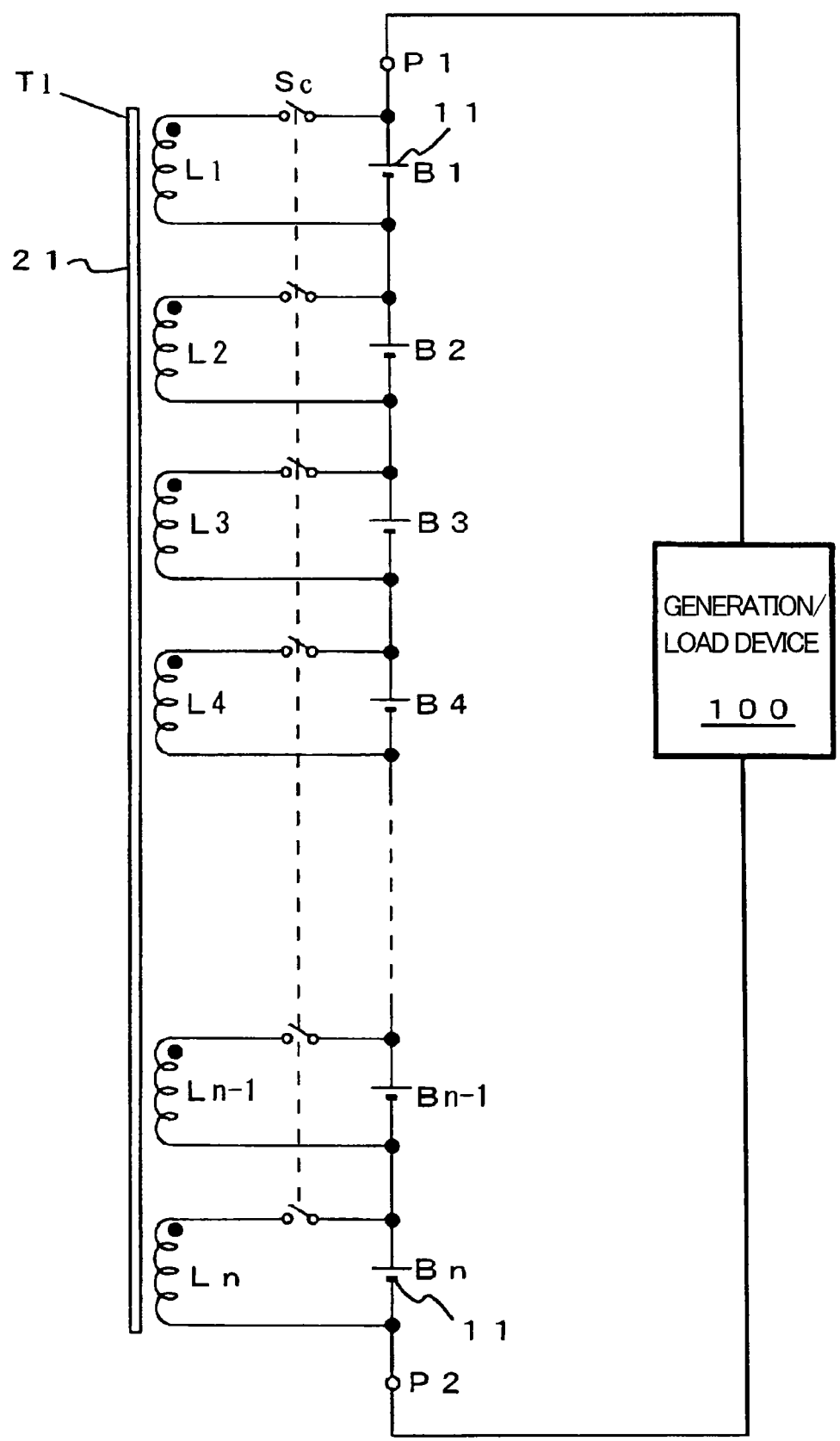
[FIG. 8] This is a circuit diagram showing a second configuration example of the series-connected rechargeable cells of the conventional example 1.

Inside each of the cell groups (G1, G2, ...), an inductor coupling, inter-cell voltage-balance correcting circuit 31 is disposed. The inter-cell voltage-balance correcting circuit 31 uses two inductors Lc1, Lc2. Both of the inductors Lc1, Lc2 are wound around a same magnetic core 22 and are magnetically coupled with each other. That is, as shown in FIG. 6, the inductors Lc1, Lc2 forms a transformer having a ratio of 1:1. Therefore, the inter-cell voltage-balance correcting circuit 31 can perform balance correcting for voltages of four cells (B1 to B4, ...) by the two inductors Lc1, Lc2.

According to the above-mentioned configuration, it is possible to further reduce wiring in the cell groups (G1, G2, ...) and the number of components. Further, since the number of series-connected cells in each of the cell groups (G1, G2, ...) increases to four, the number of cell groups is greatly reduced. Accordingly, the number of transformer coils in the inter-group voltage-balance correcting circuit 32, and the number of wiring between the inter-group voltage-balance correcting circuit 32 and rechargeable cells are further reduced greatly.

Though, the present invention has been described above based on its representative embodiment, various embodiments other than the foregoing can also be realized in the present invention. For example, the number of cells in the cell groups (G1, G2, . . . ) can be three or any number equal to or more than five.

SECOND WORKING EXAMPLE

Figure 9A:
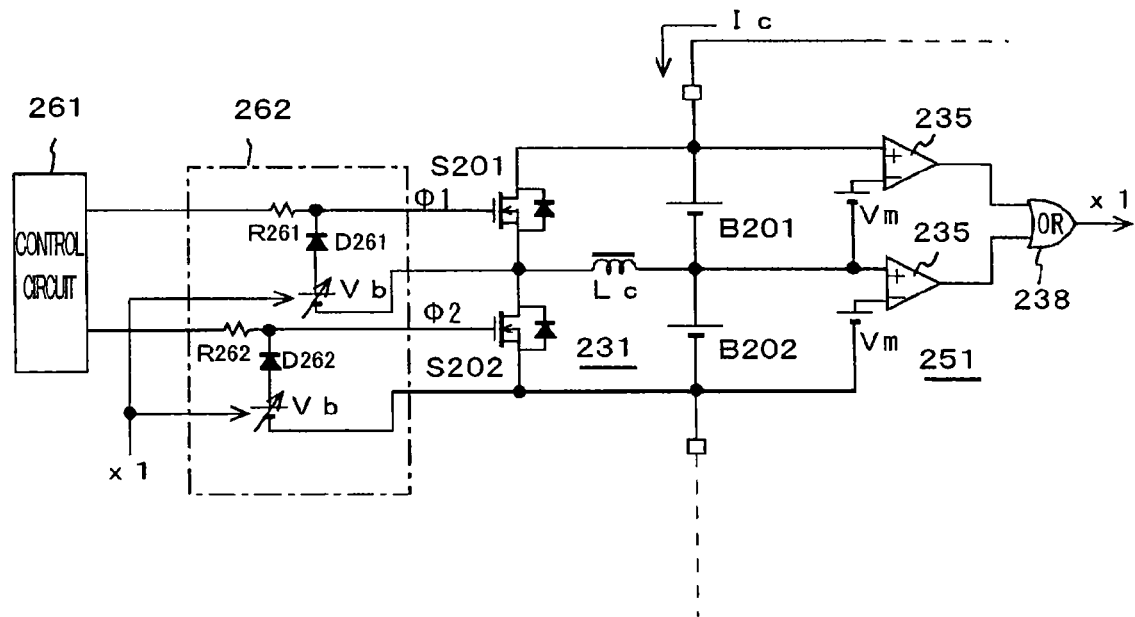
[FIG. 9] This is a circuit diagram and waveform chart showing one embodiment of a series-connected rechargeable cell device that is the second working example of the present invention, focusing on its main portion.
Figure 9B:
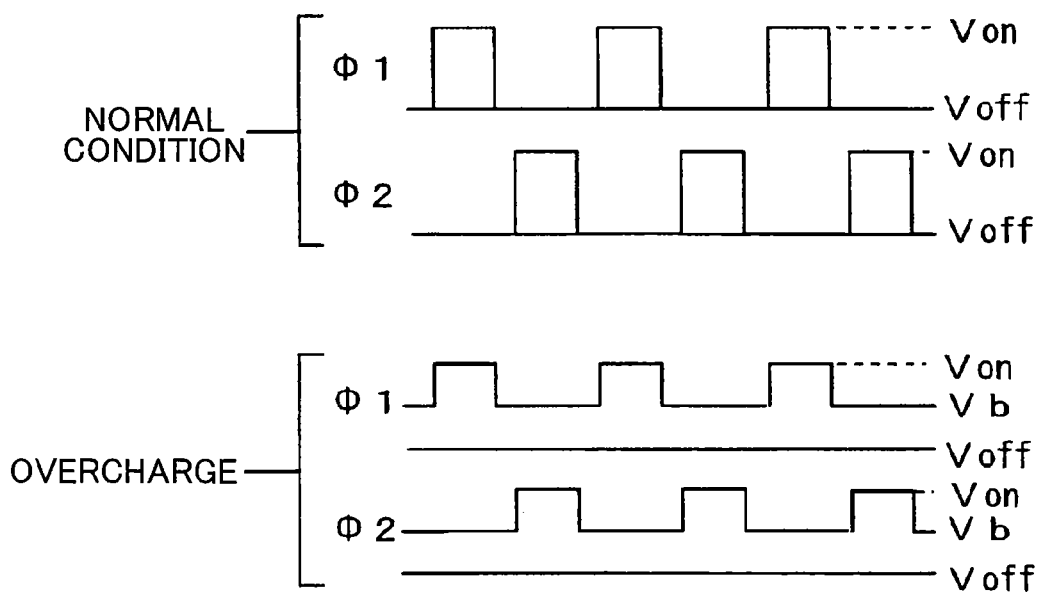
Figures 10A, 10B, 10C:
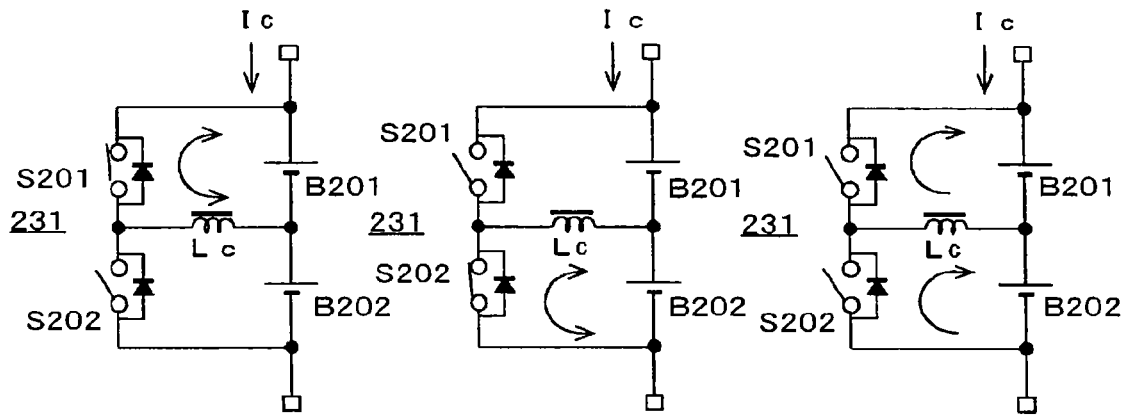
[FIG. 10] This is an equivalent circuit diagram showing rechargeable cells in the second working example for each operating condition.
Figures 10D, 10E, 10F:
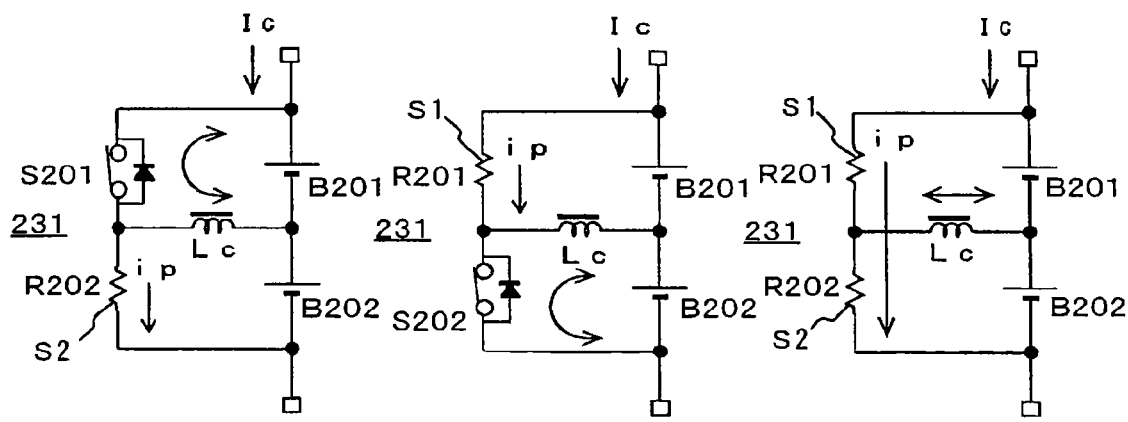
Figures 11A, 11B, 11C:
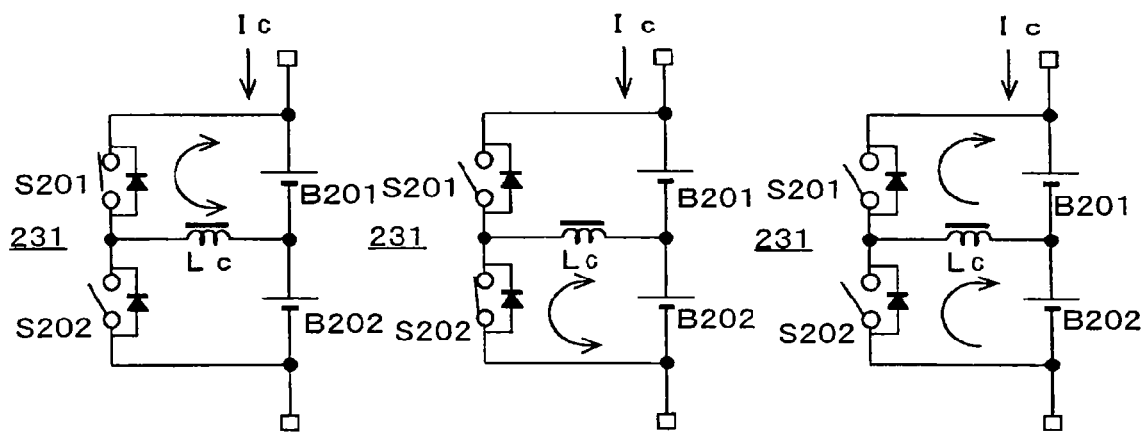
[FIG. 11] This is an equivalent circuit diagram showing operating conditions of rechargeable cells in a voltage-balance correcting circuit of the conventional example 2.

An embodiment according to the invention for achieving the above-mentioned object (2) mainly is defined as a second working example. The second working example is a series-connected rechargeable cell device, and FIG. 9 shows a main portion of the series-connected rechargeable cell device according to the second working example. In FIG. 9, (a) is a circuit diagram showing a main portion of the configuration, and (b) is a waveform chart showing a main portion of operations. FIG. 10 shows operations of the series-connected rechargeable cell device according to the working example with equivalent circuit diagrams for each of conditions. In FIG. 10, (a) to (c) shows voltage-balance correcting operations in normal condition for each operating condition, and (d) to (f) shows operations in overcharge condition for each operating condition.

As shown in (a) of FIG. 9, the series-connected rechargeable cell device of this embodiment is provided with a voltage-balance correcting circuit 231 and an overcharge detection circuit 251 as major additional devices of the series-connected rechargeable cells B201, B202.

In the configuration of the voltage-balance correcting circuit 231, both ends of two switching devices S1, S2 that are series-connected and alternately turned ON are connected in parallel to both ends of two rechargeable cells B201, B202 that are adjacent in order in the series-connection. In addition, an inductor Lc bridges a middle connecting point of the cells B201, B202 and a middle connecting point of the switching devices S201, S202, and is connected therebetween.

In the switching devices S201, S202, a power MOS-FET is used. A diode in reverse orientation respect to the rechargeable cells B201, B202 is connected in parallel to each of the switching devices S201, S202, and this diode is a parasitic diode (body diode) that is formed equivalently between a drain and source of the FET.

By alternately turning ON the two switching devices S201, S202 according to two-phase pulse control signals Φ1, Φ2 that are given from the a control circuit 261 through a level conversion circuit 262, the above-mentioned voltage-balance correcting circuit 231 balances the voltage between the cells B201, B202.

As shown in (a) of FIG. 10, when the one switching device S201 is ON, the inductor Lc is charged by an inductor current out of the other cell B201 through the S201. Also, as shown in (b) of the figure, when the S202 is ON, the inductor Lc is charged by the inductor current out of the other cell B202 through the S202.

When the other switching device S202 is ON, the inductor current that charges flowing out of the one cell B201 discharges while charging the other cell B202 through the S202. Also, when the one switching device S201 is ON, the inductor current that charges flowing out of the other cell B202 discharges while charging the one cell B201 through the S201.

By indirectly coupling the cells B201, B202 through the inductor Lc in this manner, balance correcting is performed in which the voltages of both cells B201, B202 are balanced to be a same voltage. This can prevent deterioration of cells caused by concentration of the voltage in a specific cell.

Further, in the series-connected rechargeable cell device of this embodiment, as shown in (a) of FIG. 9, the above-mentioned control signals (Φ1, Φ2 of the switching devices S201, S202 are given through the level conversion circuit 262. The level conversion circuit 262 is configured using bias voltage Vb, diodes D261, D262, and resistances R261, 262.

The level conversion circuit 262 operates only when the overcharge detection circuit 251 detects overcharge either one of the cells B201, B202, and performs level conversion for the control signals Φ1, Φ2. In normal condition except therefore, the level conversion circuit 262 is in non-operating condition in which the control signals Φ1, Φ2 are not interfered with.

The overcharge detection circuit 251 consists of a voltage detector 235 and an OR gate 238. The voltage detector 235 is provided on each of the cells B201, B202, and detects by performing analog comparison whether or not the voltages of the cells B201, B202 exceeds a predetermined overcharge-determination standard voltage Vm. This detection result is output in a form of a digital logic signal. The OR gate 238 outputs a logical sum of the detection outputs of the voltage detectors 235 as an overcharge detection signal x1. The overcharge detection signal x1 is given to the level conversion circuit 262 as an operation control signal.

The level conversion circuit 262 operates according to the overcharge detection signal x1. As shown in (b) of FIG. 9, the level conversion circuit 262 changes to a predetermined bias voltage Vb a low level of the control signals Φ1, Φ2 of the switching devices S201, S202, the control signals Φ1, Φ2, the low level serving as a OFF-setting level. The bias voltage Vb is set in advance to such a voltage (gate control voltage) as to cause the MOS-FET realizing the switching devices S201, S202 to act as resistance elements (R201, R202) having a certain resistivity.

That is, in normal condition, the control signals Φ1, Φ2 changes between a high level Von serving as a ON-setting level and a low level Voff serving as a OFF-setting level. In this case, the switching devices S1, S2 are set by switching and taking either one of a complete ON state and a complete OFF state.

On the other hand, in overcharge condition, the control signals Φ1, Φ2 changes between the high level Von serving as a ON-setting level and the bias voltage Vb. In this case, the switching devices S1, S2 are set by switching and taking either one of a complete ON state and a state in which the switches operate as resistance elements (R201, R202) having the certain resistivity.

According to the foregoing, when either one of cells B201, B202 is overcharged, the switching devices S201, S202, which is in either one of ON state and OFF state in a normal condition, act as resistance elements (R201, R202) having the certain resistivity during a period when the device should be OFF. Thereby, a current by-pass circuit in which a charging current Ic bypasses the cells B201, B202 is formed, as shown in (d) to (f) of FIG. 10. The arrow ip in the figure indicates a by-pass current that the current by-pass circuit causes to flow.

The series-connected rechargeable cell device of the above-mentioned embodiment has a configuration in which a current by-pass circuit for protecting rechargeable cells in overcharge condition is formed using a switching device of a voltage-balance correcting circuit. Therefore, without increasing the number of components and costs or without difficulty in mounting, the series-connected rechargeable cell device can have both functions to balancing voltages between cells and to protect cells in overcharge condition.

Further, the series-connected rechargeable cell device of the above-mentioned embodiment includes an inductor-coupled, voltage-balance correcting circuit in which a switching device and an inductor are used. This type of balance correcting circuit is particularly suitable for realizing the above-mentioned function to protect cells in overcharge condition.

The function to protect cells in overcharge condition is realized by the current by-pass circuit; a particularly suitable configuration of this current by-pass circuit is a configuration in which the function is realized by operating as a resistance element a switching device that is not ON.

As a configuration in which a switching device operates as a resistance element, a configuration is most suitable in which, as the above-mentioned embodiment, a MOS-FET is used as a switching device and a level conversion circuit is disposed, the level conversion circuit converting a OFF-setting level of a two-level control signal that controls ON/OFF of the MOS-FET, into a level at which the signal sets the FET at the certain resistivity.

Though, the second working example has been described above based on its representative embodiment, various embodiments other than the foregoing can also be realized. For example, two cells are used alone in the invention according to the second working example. However, series-connected cells with a cell balancer are used for B201, B202, so that this invention can be applied preferably to a series-connected rechargeable cell device in which a large number of rechargeable cells equal to or more than four are series-connected.

THIRD WORKING EXAMPLE

An embodiment according to the invention for achieving the above-mentioned object (3) mainly is defined as a third working example. The third working example is a voltage-balance correcting circuit for series-connected cells; a voltage-balance correcting circuit for series-connected cells, which is a basic example of the third working example is shown in FIG. 12. The circuit shown in the figure includes two transformer coils L1, L2 that are wound around a same magnetic core 311, and two switches SW1, SW2 that are turned ON/OFF in conjunction with each other. The magnetic core 311 and the coils L1, L2 constitute a kind of a transformer T301. The coils L1, L2 are each wound having the same number of turns and have the transformation ratio of 1:1.

The two coils L1, L2 are connected to two series-connected rechargeable cells E1, E2 through the switches SW1, SW2 on a one-to-one basis. The switches SW1, SW2 are turned ON/OFF at a same timing by a control circuit that is not shown.

The foregoing configuration realizes the balancing operation for the voltages of the cells E1, E2. That is, the two cells E1, E2 are AC-coupled through the switches SW1, SW2 and a transformer T301; when the voltage of one of the cells is higher than the other cell, electric power transmission is performed by the transformer T301 from the cell having higher voltage to the cell having lower voltage so that the voltages of the cells are balanced.

Further in this embodiment, in addition to the above-mentioned configuration, a commutation circuit is disposed that, during a period when the foregoing switches SW1, SW2 change from ON to OFF, a self-induced current generated in the coil L1 (or L2) that is supplied with a primary current from the rechargeable cell E1 (or E2) discharges through a current-carrying path for charging the cell E2 (or E1) that is not the cell E1 (or E2) connected to the coil L1 (or L2). The commutation circuit is configured using first and second backflow-preventing diodes D1, D2 as to be described later.

The backflow-preventing diodes D1, D2 extend and are each connected between the two transformer coils L1, L2. Regarding the first diode D1, its cathode is connected between the first coil L1 and the switch S1, and its anode is connected to a negative electrode of the second cell E2. In this case, the switch SW1 is disposed between one of electrodes (in-phase electrode) of the transformer coil L1 and a positive electrode of the first cell E1. Besides, the other of the electrodes (anti-phase electrode) of the coil L1 is directly connected to a negative electrode of the first cell E1.

Regarding the second diode D2, its anode are connected between the second coil L2 and the switch S2, and its cathode is connected to the positive electrode of the first cell E1. In this case, the switch SW2 is disposed between an anti-phase electrode of the transformer coil L2 and the negative electrode of the second cell E2. Besides, an in-phase electrode of the coil L2 is directly connected a positive electrode of the second cell E2.

In the foregoing, the first diode D1 forms the first discharge circuit 321 that causes a self-induced current to charge the rechargeable cell E2 on the second coil L2 side, the self-induced current being generated when the first coil L1 is supplied with a primary current. The second diode D2 forms the second discharge circuit 322 that causes a self-induced current to charge the rechargeable cell E1 on the first coil L1 side, the self-induced current being generated when the second coil L2 is supplied with a primary current.

FIG. 13 illustrates operations of the circuit shown in FIG. 12. In (a) of the figure, an operation when the voltage of the first cell E1 is higher than that of the second cell E2 is shown. In this case, when the switches SW1, SW2 is turned ON, the coil L1 is supplied with a primary current from the cell E1 through the switch SW1. This primary current is induced in the coil L2 as a secondary current, and the second cell E2 is charged by this current through the switch SW2. This charging balances the voltages of the cells E1, E2.

Here, when the switches SW1, SW2 change from ON to OFF, a self-induced current is generated in the coil L1 that is supplied with a primary current through the switch SW1. This induced current flows in a discharge loop that is formed by the coil L1, the second cell E2, and the diode D1, as shown by the dotted line in (a) of the figure. This allows the self-induced current of the coil L1 to dissipate, and makes it possible to prevent the generation of counter-electromotive force having high voltage in the coil L1.

It should be noted that the foregoing discharging current (reset current) flows in a direction that causes the second cell E2 to be charged. Consequently, without wasting an electrical energy that is stored in the coil L1, it is possible to effectively utilize the electrical energy for balancing the voltage.

In contrast to the foregoing case, an operation when the voltage of the first cell E1 is lower than that of the second cell E2 is illustrated in (b) of the figure. In this case, when the switches SW1, SW2 are turned ON, the coil L2 is supplied with a primary current from the cell E2 through the switch S2. The primary current is induced in the coil L1 as a secondary current, and the second cell E2 is charged by this current through the switch SW1. This charging balances the voltages of the cells E1, E2.

When the switches SW1, SW2 changes from ON to OFF, a self-induced current is generated in the coil L2 that is supplied with a primary current through the switch SW2. This induced current flows in a discharge loop that is formed by the coil L2, the first cell E1, and the diode D2, as shown by the dotted line in (b) of the figure. This allows the self-induced current of the coil L2 to dissipate, and makes it possible to prevent the generation of counter-electromotive force having high voltage in the coil L2.

Also in this case, the current (reset current) flowing in the foregoing loop flows in a direction that causes the first cell E1 to be charged. Without wasting an electrical energy that is stored in the coil L2, this makes it possible to effectively utilize the electrical energy for balancing the voltage.

In this manner, it is possible to, rapidly and efficiently, balance the voltages of a plurality of rechargeable cells that are series-connected, without great electric power loss.

Figure 14:
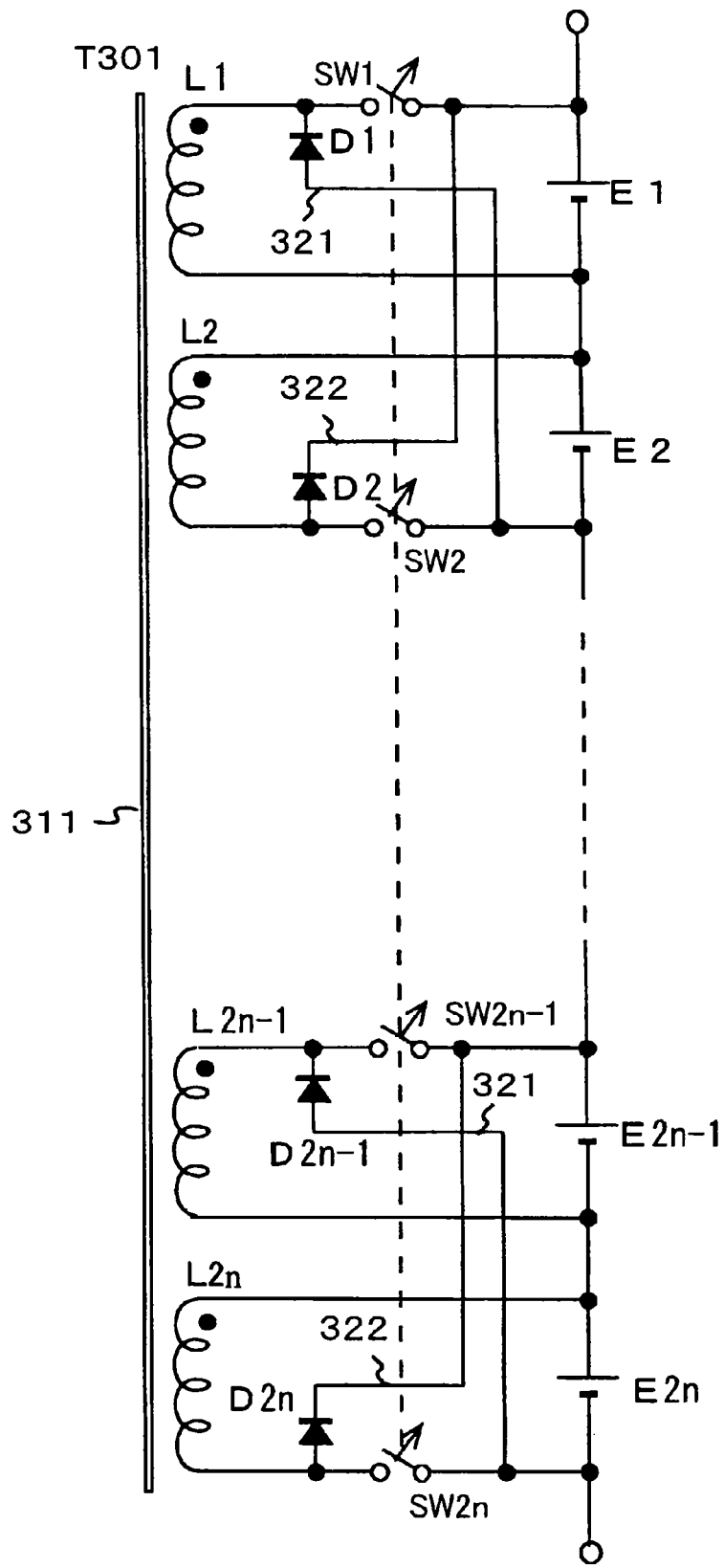
[FIG. 14] This is a circuit diagram showing the modified example 1 of the voltage-balance correcting circuit in the third working example.

FIG. 14 shows a voltage-balance correcting circuit according to the modified example 1 of the second working example. In the circuit shown in FIG. 12, the voltages of two rechargeable cells E1, E2 that are series-connected is balanced; also, this circuit allows any (n) number of cells that are stacked in series-connection to be used, as shown in the figure.

In the circuit shown in the figure, 2n number of coils L1 to L2n, the switches SW1 to SW2n, and diodes D1 to D2n are used, and the voltages of 2n number of series-connected cells E1 to E2n is balanced.

Figure 15:
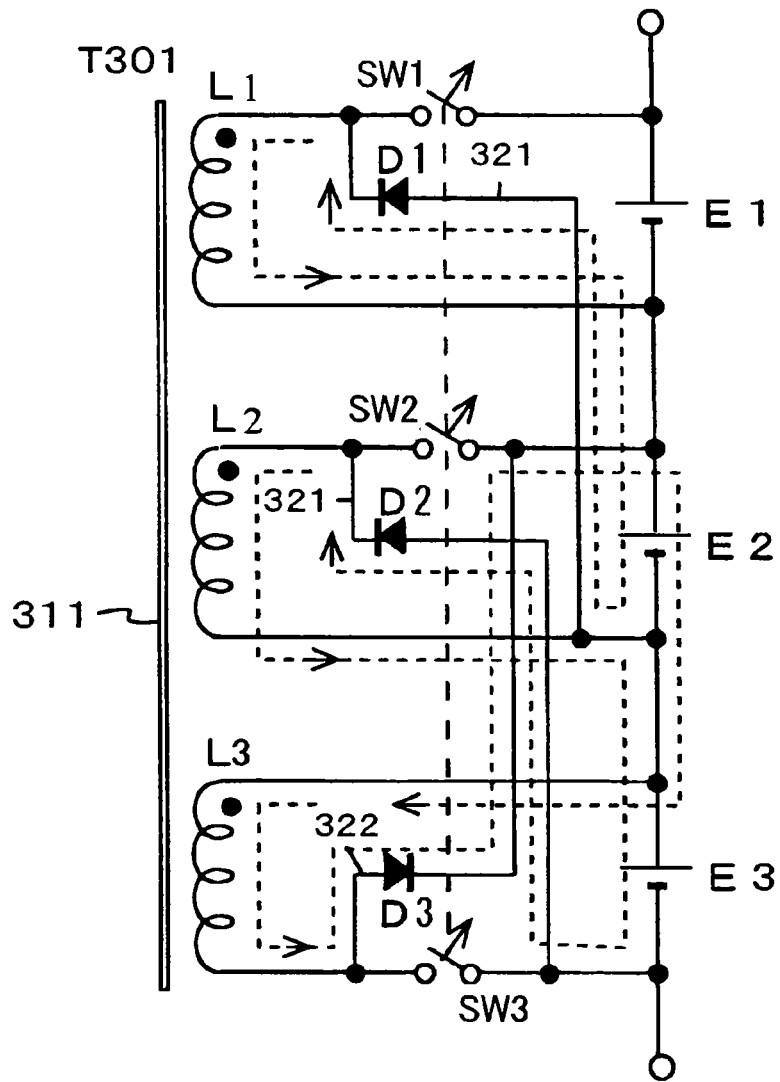
[FIG. 15] This is a circuit diagram showing the modified example 2 of the voltage-balance correcting circuit in the third working example.

FIG. 15 shows a voltage-balance correcting circuit according to the modified example 2 of the third working example. In the above-mentioned embodiments (basic example, modified example 1, and modified example 2), two sets of transformer coil and rechargeable cell is defined as a pair; for the respective pairs, a commutation circuit that is composed of the first and second discharge circuits 321, 322 is provided. Therefore, the number of rechargeable cells that are series-connected and whose voltages are to be balanced is even number (2n).

However, the modified example 2 can be applied to an odd number of series-connected cells. In FIG. 15, a voltage-balance correcting circuit for series-connected cells consisting of three cells is illustrated. In the circuit shown in the figure, three cells E1 to E3 are series-connected; regarding a transformer coil L1 and a rechargeable cell E1 that are not mated, only the first discharge circuit 321 is disposed.

Figure 16:
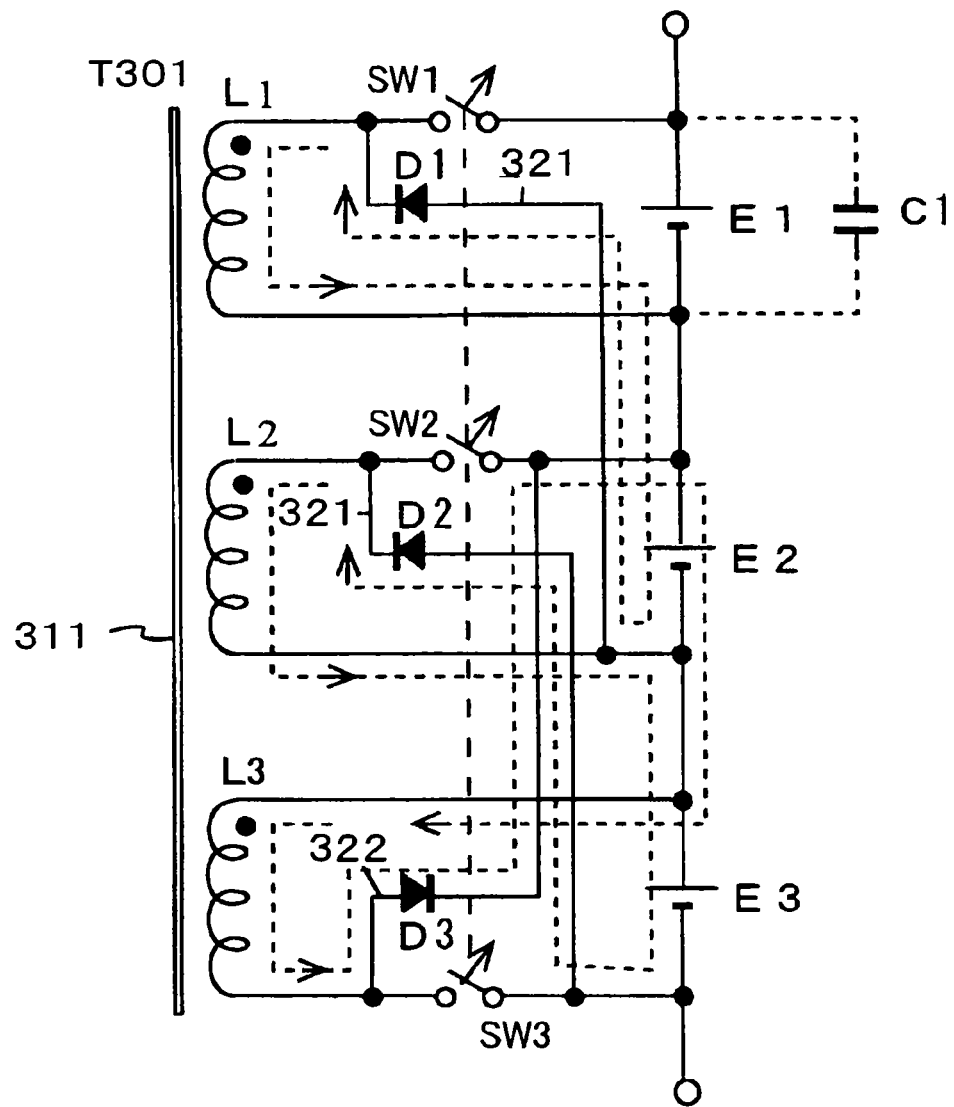
[FIG. 16] This is a circuit diagram showing an improved example of the voltage-balance correcting circuit shown in FIG. 15.

Therefore, in the rechargeable cell E1, there is a tendency that the voltage balance operation by a self-induced current when the SW1 to SW3 are turned OFF is incomplete and a ripple current increases. In this case, the ripple current can be reduced by setting the charge and discharge capacity of the cell E1 larger than other cells E2, E3, or by adding a capacitor C1 so as to be parallel to the cell E1 as shown in FIG. 16.

Figure 17:
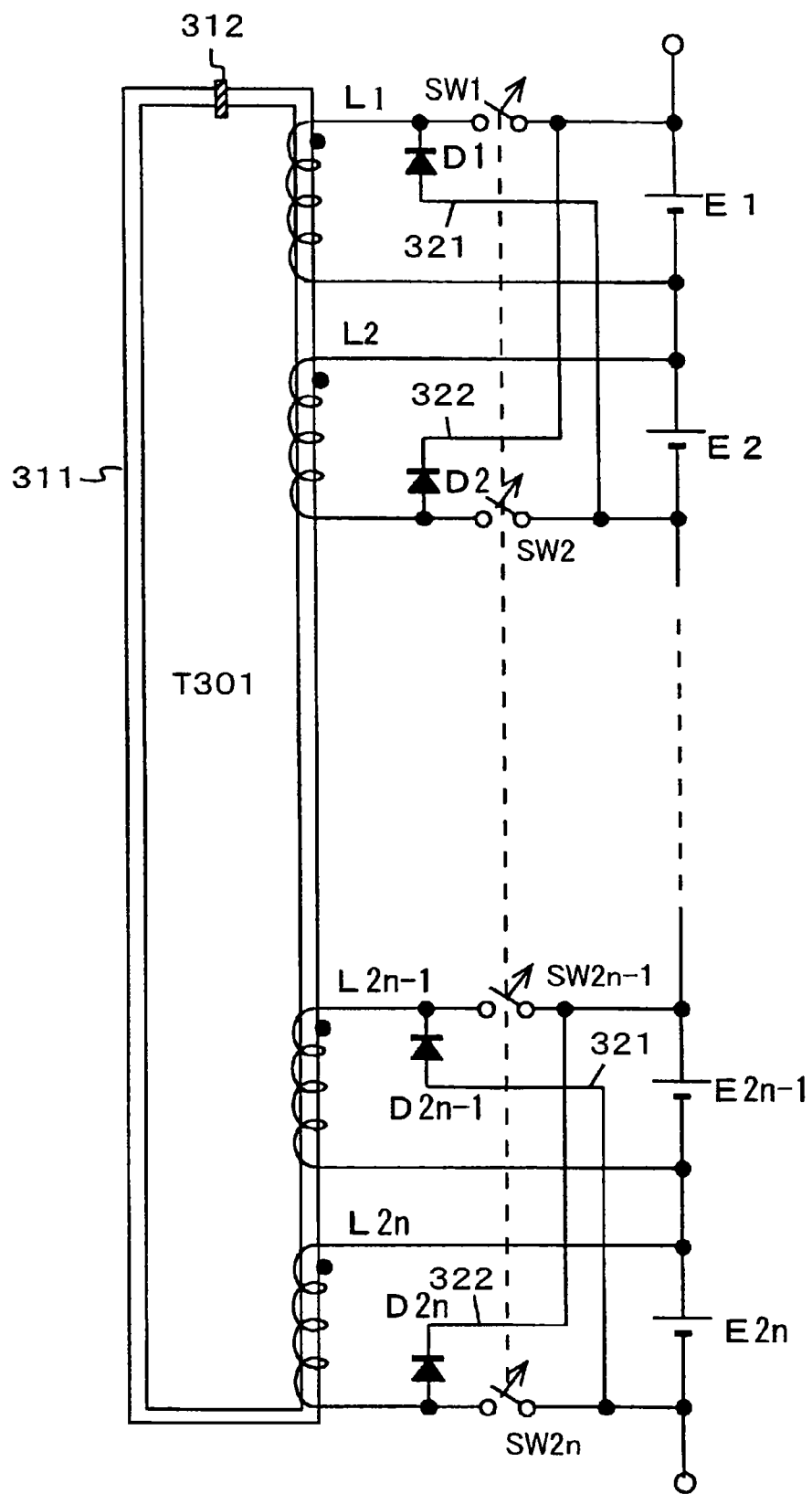
[FIG. 17] This is a circuit diagram showing the modified example 3 of the voltage-balance correcting circuit in the third working example.

FIG. 17 shows a voltage-balance correcting circuit according to the modified example 3 of the third working example. The embodiment according to the modified example 3 is characterized by providing a magnetic route gap 312 on a magnetic core 311 around which coils L1 to L2n are wound. If the magnetic route gap 312 is provided on the magnetic core 311, magnetic saturation is unlikely to occur while the magnetic permeability of magnetic circuits decreases and inductances of the coils L1 to L2n decrease. This allows a large exciting current to flow in the coils L1 to L2n. This means to enhance a function to balance the voltage during OFF period of SW1 to SW2n.

Figure 18:
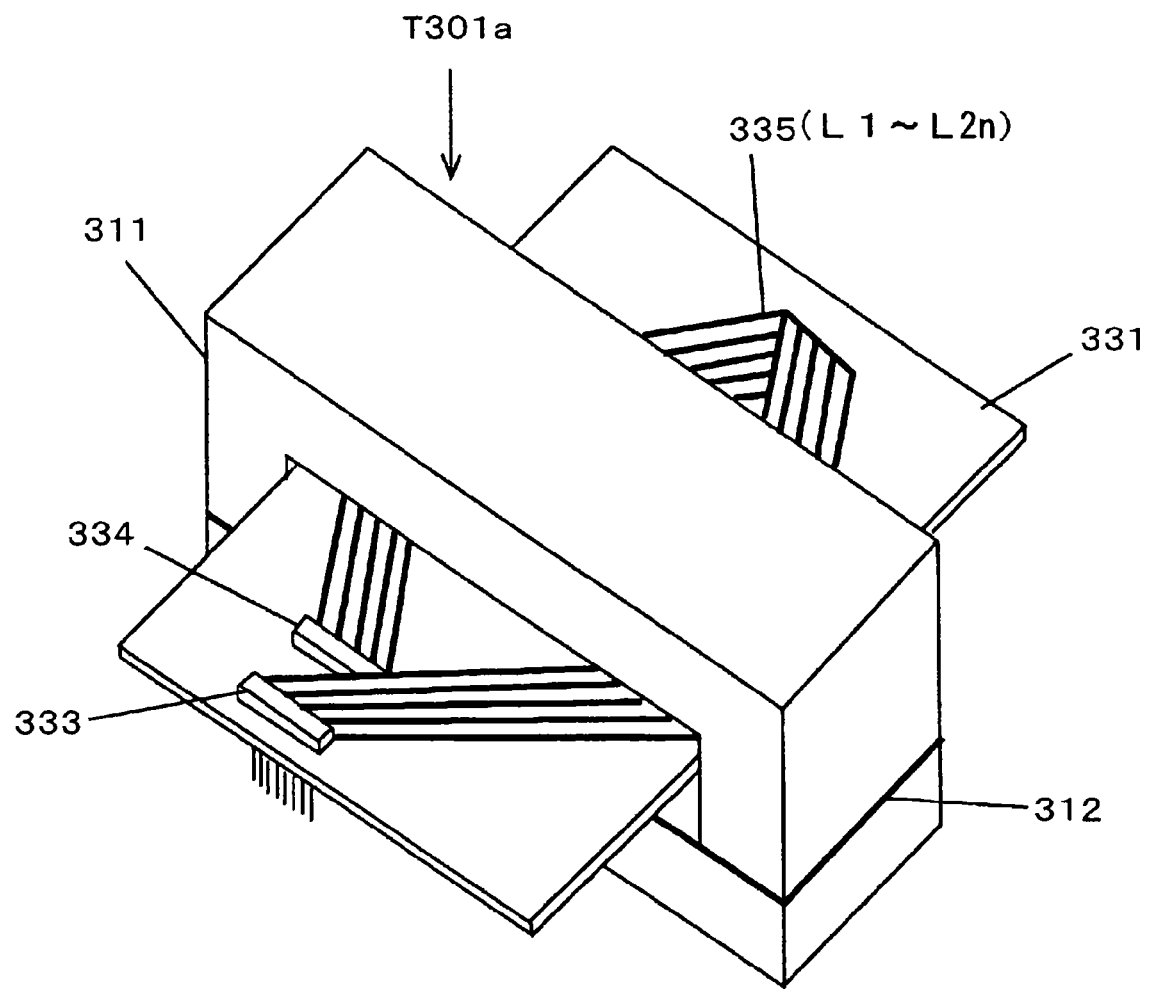
[FIG. 18] This is a perspective view showing the modified example 4 of the voltage-balance correcting circuit in the third working example, taking its main portion.

The modified example 4 according to the third working example is characterized by a transformer that acts as a main portion of the voltage-balance correcting circuit. The appearance of the transformer is shown in FIG. 18. As shown in the figure, in a transformer T301a used in this embodiment, a flat cable belt 335 is used for transformer coils L1 to L2n, the flat cable belt 335 being formed by lining in parallel coated wires the number of which is the number of the coils. The transformer coils L1 to L2n are formed by a flat loop body that is formed by bending the flat cable belt 335. Further, the transformer T301a shown in the figure allows difference among induced voltages of the coils L1 to L2n to decrease by bending the cable belt 335 odd number of times.

The flat cable belt 335 forms a flat loop body with sticking onto the printed wiring board 331, and its ends are connected to connector terminals 333, 334 installed on a board 31. The basic configuration of the transformer T301a is the same as disclosed in Japanese Patent No. 3654816, except that all of the coils that are wound have the same number of turns.

Since this transformer T301a makes a large number of coils L1 to L2n identical in inductance characteristics and the like with high accuracy, the transformer T301a is effective particularly for performing the voltage balance operation with high accuracy.

Figure 19:
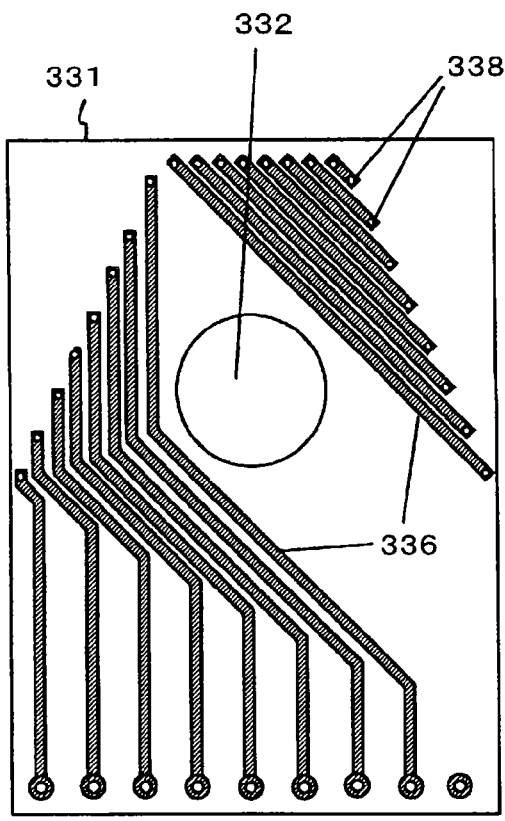
[FIG. 19] This is a plan view showing the modified example 5 of the voltage-balance correcting circuit in the third working example, taking its main portion.
Figure 19:
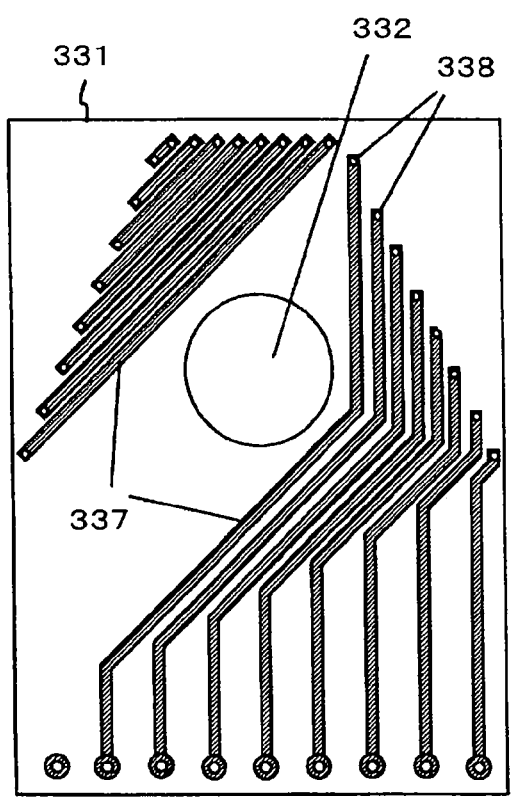

The modified example 5 according to the third working example is also characterized by a transformer that acts as a main portion of the voltage-balance correcting circuit. FIG. 19 shows a main portion of the embodiment according to the modified example 5. As a coil section is shown in (a) and (b) of the figure, in a transformer T301b used in this embodiment, a plurality of flat coils L1 to L2n are formed by wiring conductor patterns 336, 337 with through holes 338, the conductor patterns being formed on front and back surfaces of the printed wiring board 31.

The basic configuration of the transformer T301b is also the same as disclosed in the above-mentioned Japanese Patent No. 3654816, except that all of the coils that are wound have the same number of turns. In addition, by connecting the patterns with bending the patterns odd number of times using through holes, the transformer T301b makes a large number of coils L1 to L2n identical in inductance characteristics and the like with high accuracy. Therefore, the transformer T301b is effective particularly for performing the voltage balance operation with high accuracy.

Figure 20:
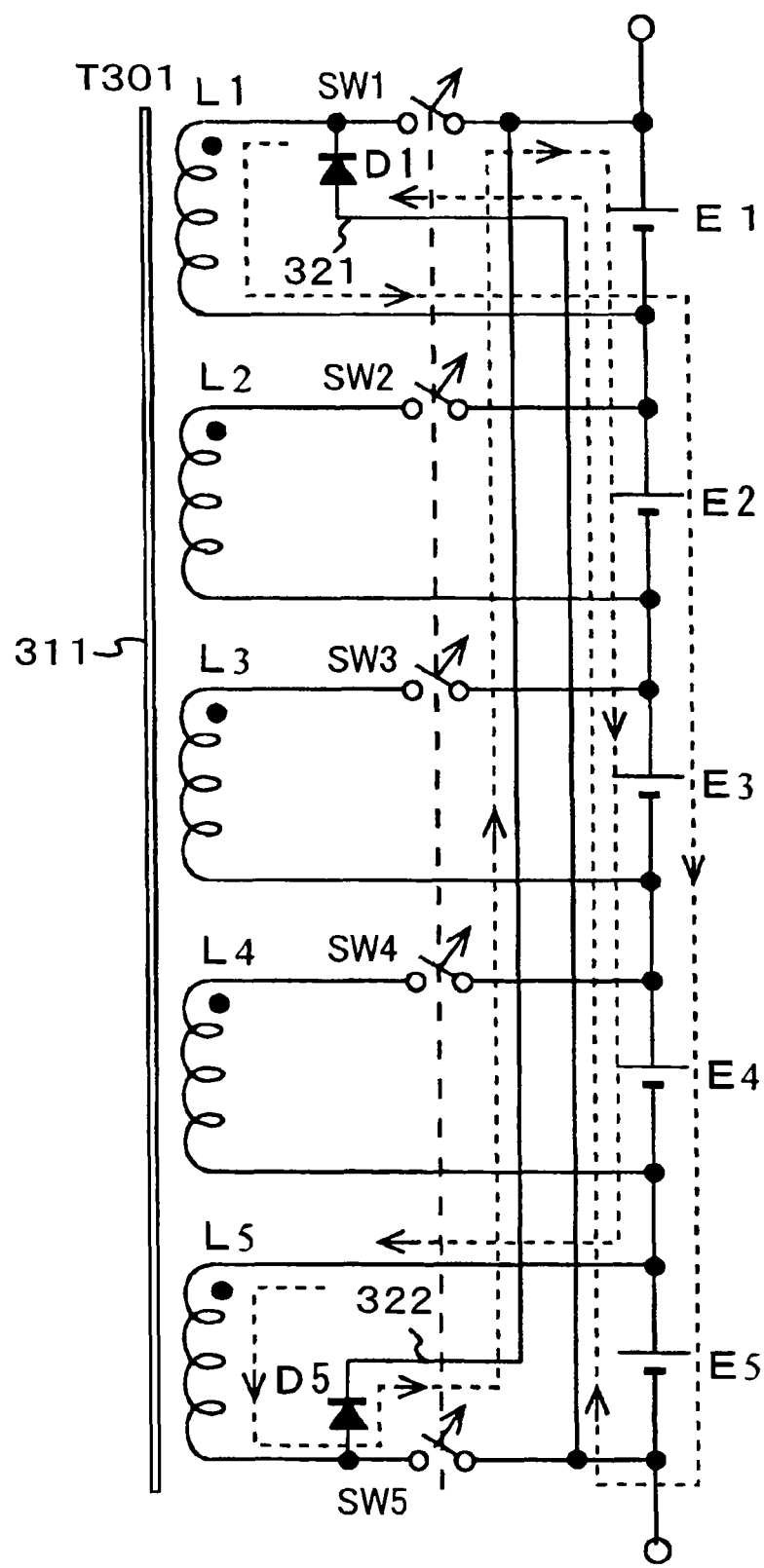
[FIG. 20] This is a circuit diagram showing the modified example 6 of the voltage-balance correcting circuit in the third working example.
Figure 21:
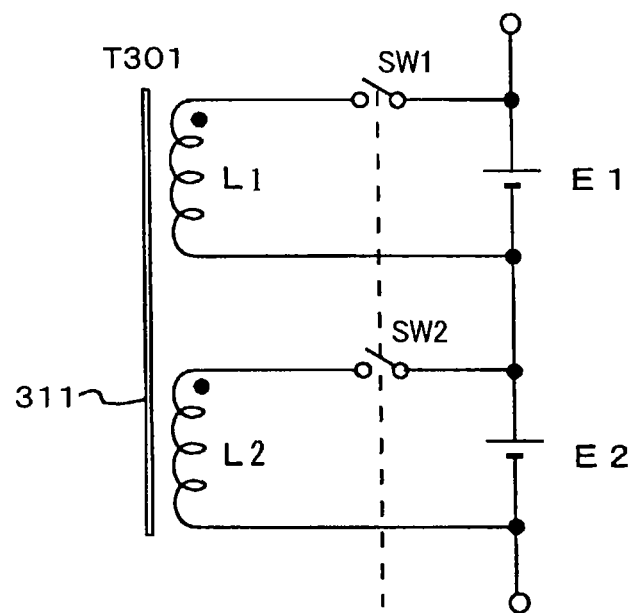
[FIG. 21] This is a circuit diagram showing one example of a voltage-balance correcting circuit in the conventional example 3.
Figure 22:
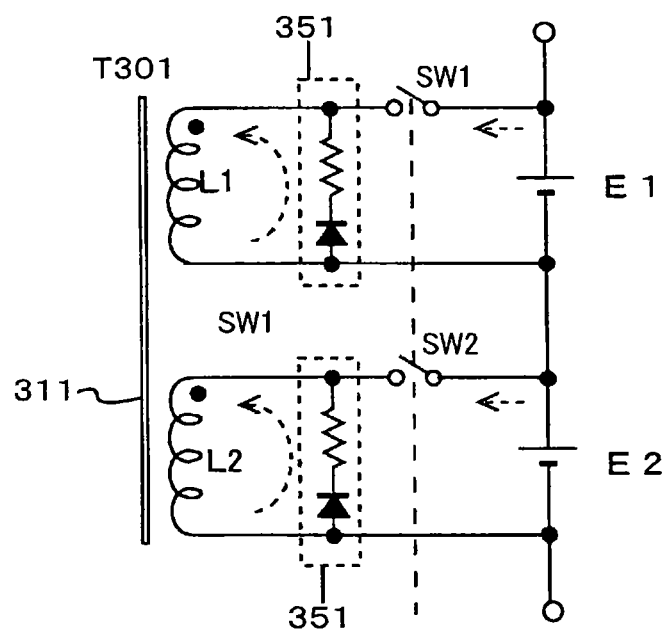
[FIG. 22] This is a circuit diagram showing other examples of the voltage-balance correcting circuit in the conventional example 3.

FIG. 20 shows an embodiment according to the modified example 6. In the embodiment shown in the figure, only on the cells E1, E5 that are at ends of the series-connected rechargeable cells E1 to E5, discharge loop 321, 322 are respectively formed by the backflow-preventing diodes D1, D5.

In this case, the discharge loop 321 by a diode D1 that is disposed at a top end (high-level end) of the series-connection is formed so that a reset current discharges while charging all of the series-connected cells E1 to E5 via the series-connection, the reset current being generated in a coil L1 when a switch SW1 changes from ON to OFF.

In similar manner, the discharge loop 322 by a diode D2 that is disposed at a bottom end (low-level end) of the series-connection is formed so that a reset current discharges while charging all of the above-mentioned series-connected cells E1 to E5 via the series-connection, the reset current being generated in a coil L5 when a switch SW5 changes from ON to OFF.

In the embodiment of the modified example 6, in similar manner as the above-mentioned embodiment, the voltage balance operation is performed by transformer coils L1 to L5 and the conjunctive switches SW1 to SW5 that are disposed for each of the cells E1 to E5. According thereto, the reset currents of the coils L1, L5 energize the series-connected cells E1 to E5 via the series-connection so that it is possible to set high the reset voltage, that is, the counter electromotive voltages of the coils L1, L5.

Setting the counter electromotive voltages (reset voltages) high makes it possible to increase an energizing time rate to the coils L1 to L5, that is, an ON-time rate of the switch SW1 to SW5 (duty). Accordingly, in this embodiment, the ON-time rate (duty) of the SW1 to SW5 can be set high, for example, 50% or more. This makes a period of the voltage balance operation longer, the voltage balance operation being performed by each of the cells E1 to E5 connecting to the coils L1 to L5 through the switches SW1 to SW5. This results in achievement of an advantage that an effect of the voltage balance correction is enhanced.

Though the shown embodiment is the example of the series-connection of five cells, a series-connection of multi cells except for five cells is the same. Further, the embodiment can be applied regardless of whether the number of series-connected cells is odd or even. Further, in the case where, for example, tens to hundreds or more of cells are series-connected, the technology of the above-mentioned embodiment is simply applied by dividing the cells into groups having a proper number of series-connected cells.

Though the present invention was described above based on its representative working examples, various embodiments other than the foregoing can also be realized in the present invention. For example, though a rectifier diode, which is a simple non-linear element having two terminals is used as the backflow-preventing diodes D1 to D2$n$ in the above-mentioned embodiment, it is possible to replace the diode with a rectifier circuit (equivalent diode) in which a MOS-FET and the like is used and that is switching type (synchronizing type).

The invention claimed is:

1. A series-connected rechargeable cell device, comprising:
   a plurality of rechargeable cells that are series-connected, and that are divided into a plurality of series-connected cell groups placed continuously in order of connecting; and
   a voltage-balance correcting circuit that balances the voltages of the cells, and that is provided with:
      an inter-cell voltage-balance correcting circuit that performs voltage-balance correcting between adjacent cells in each of the cell groups and confined within the cell group, wherein one end of an inductor is connected between a common point between the two cells to be balanced, and the other end of the inductor is connected between two switching circuits, and
      an inter-group voltage-balance correcting circuit that performs balance correcting of series-connection voltages of the cell groups by AC-coupling formed with a transformer coil and a switching circuit,
   the inter-group voltage-balance correcting circuit including:
   a plurality of transformer coils each having ends respectively connected to series-connection ends of each of the series-connected cell groups, that are magnetically coupled at the transformation ratio of 1:1, and
   a plurality of switching circuits, disposed between the transformer coils and the cell groups, respectively, that apply a current to each of the transformer coils simultaneously by being turned ON/OFF in phase in accordance with a periodic pulse signal.

2. The series-connected rechargeable cell device according to claim 1, characterized in that
   the inter-cell voltage-balance correcting circuit performs voltage-balance correcting between a first cell and a second cell that are adjacent, by charging and discharging by an inductor current between the cells.

3. The series-connected rechargeable cell device according to claim 2, characterized in that the inter-cell voltage-balance correcting circuit is configured using an inductor that is connected alternately to the first cell and the second cell and that performs charge and discharge by the inductor current.

4. The series-connected rechargeable cell device according to claim 2, characterized in that the inter-cell voltage-balance correcting circuit is configured using
   a first inductor that discharges itself through a charge path of the second cell when the first inductor is charged by the inductor current from the first cell,
   a second inductor that discharges itself through a charge path of the first cell when the second inductor is charged by the inductor current from the second cell, and
   a switching circuit that switches charge and discharge of the first and second inductors.

5. The series-connected rechargeable cell device according to claim 2, characterized in that
   a plurality of the inductors that the inter-cell voltage-balance correcting circuit is composed of are disposed in the cell groups, and
   the inductors are magnetically coupled with each other.

6. A series-connected rechargeable cell device comprising:
   a plurality of rechargeable cells that are series-connected, and that are divided into a plurality of series-connected cell groups placed continuously in order of connecting; and
   a voltage-balance correcting circuit that balances the voltages of the cells, and that is provided with:
      an inter-cell voltage-balance correcting circuit that performs voltage-balance correcting between adjacent cells in each of the cell groups and confined within the cell group, wherein one end of an inductor is connected between a common point between the two cells to be balanced, and the other end of the inductor is connected between two switching circuits, and
      an inter-group voltage-balance correcting circuit that performs balance correcting of series-connection voltages of the cell groups by AC-coupling formed with a transformer coil and a switching circuit,
   the inter-group voltage-balance correcting circuit including:
   a primary coil that connects to an end of all series-connected cell groups;
   a primary coil-side switching circuit that is series-connected to the primary coil;
   a plurality of secondary coils that respectively connect to an end of each of the series-connected cell groups and that are magnetically coupled to each other with the transformation ratio between each other being 1:1; and
   a plurality of secondary coil-side circuits, disposed between the secondary coils and the cell groups, respectively, that apply a current to each of the secondary coils simultaneously in accordance with a periodic pulse signal.

7. A series-connected rechargeable cell device, comprising:
   a plurality of rechargeable cells that are series-connected;
   a voltage-balance correcting circuit in which:
      a semiconductor switching device includes a MOS-FET and is configured to balance the voltage between the cells, the MOS-FET being turned on or off by a control signal having a first level for turning on and a second level for turning off; and
   a level conversion circuit configured to convert the second level of the control signal to a third level to control the MOS-FET to be in an intermediate state between an ON state and an OFF state, the MOS-FET acting as a resister in the intermediate state to allow current to flow therethrough, wherein
   the level conversion circuit is configured not to operate in a normal condition, but to operate in an overcharge condition to convert the second level of the control signal to the third level to cause the MOS-FET to be a bypass circuit so that a charging current flows through the MOS-FET to bypasses the researchable cells.

8. The series-connected rechargeable cell device according to claim 7, wherein the voltage-balance correcting circuit has a configuration in which
both ends of two switching devices that are series-connected and are alternately turned ON are connected in parallel to both ends of two rechargeable cells that are adjacent in order in the series-connection, and
in which an inductor bridges a middle connecting point of the two rechargeable cells and a middle connecting point of the two switching devices and is connected therebetween.

9. The series-connected rechargeable cell device according to claim 7, wherein
the level conversion circuit comprises a diode, a resistor, and a bias voltage source.

10. A voltage-balance correcting circuit for series-connected cells, comprising:
a plurality of rechargeable cells that are series-connected;
a plurality of transformer coils that are wound around a same magnetic core having the same number of turns and that have the transformation ratio of 1:1;
switches that are turned ON/OFF in conjunction with each other and through which the rechargeable cells are connected to the transformer coils on a one-to-one basis so that the voltage of each of the cells is balanced; and
a commutation circuit that during a period when the switches change from ON to OFF, a self-induced current generated in the coil that is supplied with a primary current from the rechargeable cell discharges through a path for charging the cell other than the cell that is not connected to the coil,
the commutation circuit including a first discharge circuit and a second discharge circuit that are connected between a first transformer coil and a second transformer coil,
the first discharge circuit being configured in such a manner that a self-induced current that is generated when the first transformer coil is supplied with the primary current charges the rechargeable cell that corresponds to the second transformer coil through a backflow-preventing diode, and
the second discharge circuit being configured in such a manner that a self-induced current that is generated when the second transformer coil is supplied with the primary current charges the rechargeable cell that corresponds to the first transformer coil through a backflow-preventing diode.

11. The voltage-balance correcting circuit for series-connected cells according to claim 10, wherein the first discharge circuit and the second discharge circuit are disposed between the transformer coils that are connected through the switches respectively to two adjacent series-connected rechargeable cells.

12. The voltage-balance correcting circuit for series-connected cells according to claim 10, wherein
the commutation circuit is disposed for each pair of two sets of the transformer coil and the rechargeable cell, and
either one of the first discharge circuit and the second discharge circuit is disposed for a set of a transformer coil and a rechargeable cell that are not mated.

13. The voltage-balance correcting circuit for series-connected cells according to claim 12, wherein the rechargeable cell that is not mated has a larger charge and discharge capacity than another cell.

14. The voltage-balance correcting circuit for series-connected cells according to claim 10, wherein a magnetic core around which the transformer coil is wound is provided with a magnetic route gap.

15. The voltage-balance correcting circuit for series-connected cells according to claim 10, wherein the transformer coil is formed by a flat loop body in which a flat cable belt is used and that is formed by bending the flat cable belt, the flat cable belt being formed by lining in parallel coated wires the number of which is the number of the coils.

16. The voltage-balance correcting circuit for series-connected cells according to claim 10, wherein the transformer coil is formed by wiring a conductor pattern with a through hole, the conductor pattern being formed on a front surface and a back surface of a printed wiring board.

17. The voltage-balance correcting circuit for series-connected cells according to claim 10, wherein at least one of a first discharge loop and a second discharge loop is disposed in which a self-induced current is released while charging a plurality of the series-connected cells connected to others, the self-induced current being generated in either one of the transformer coil that is provided on a high-level end of series-connected rechargeable cells and the transformer coil that is provided on a low-level end.

18. The voltage-balance correcting circuit for series-connected cells according to claim 10, wherein the backflow-preventing diode is configured using a rectifier diode.

* * * * *